United States Patent
Batcheller et al.

(10) Patent No.: US 9,202,318 B2
(45) Date of Patent: Dec. 1, 2015

(54) GROUND FLEET OPERATIONS QUALITY MANAGEMENT SYSTEM

(71) Applicant: Appareo Systems, LLC, Fargo, ND (US)

(72) Inventors: David C. Batcheller, Fargo, ND (US); Robert V. Weinmann, Wahpeton, ND (US); Barry D. Batcheller, West Fargo, ND (US); Jacob A. Halvorson, Moorhead, MN (US); Jeffrey L. Johnson, West Fargo, ND (US); Nicholas L. Butts, West Fargo, ND (US); Jonathan L. Tolstedt, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 14/728,994

(22) Filed: Jun. 2, 2015

(65) Prior Publication Data

US 2015/0269790 A1 Sep. 24, 2015

Related U.S. Application Data

(63) Continuation-in-part of application No. 14/060,488, filed on Oct. 22, 2013, now Pat. No. 9,047,717, which is a continuation-in-part of application No. 11/903,112, filed on Sep. 20, 2007, now Pat. No.

(Continued)

(51) Int. Cl.
*G06F 7/70* (2006.01)
*G07C 5/00* (2006.01)
(Continued)

(52) U.S. Cl.
CPC ............ *G07C 5/008* (2013.01); *B60K 35/00* (2013.01); *H04L 67/12* (2013.01); *B60K 2350/1056* (2013.01)

(58) Field of Classification Search
CPC ........ A01B 76/00; A01B 63/10; A01B 63/14; G05B 15/02
USPC ............... 701/1, 3–18, 23–27, 35, 38, 44, 701/400–541; 348/144, 143, 148, 145, 153, 348/159; 340/945, 948–983; 342/2, 26 B, 342/29–40, 60–158, 357.53
See application file for complete search history.

(56) References Cited

U.S. PATENT DOCUMENTS 2,975,671 A   3/1961   Hemstreet
3,050,870 A   8/1962   Helig
(Continued)

FOREIGN PATENT DOCUMENTS

CA   2305633   10/2001
EP   0445270   10/1992
(Continued)

OTHER PUBLICATIONS

"Free In-Cockpit Weather No Subscription ADS-B/NextGen SkyVision Xtreme Video 3", SkyVisionXtreme's channel on YouTube, uploaded on Jun. 14, 2011, retrieved from the Internet: www.youtube.com/watch?v=32h-H3c9jOc.

(Continued)

*Primary Examiner* — Muhammad Shafi
(74) *Attorney, Agent, or Firm* — Jonathan L. Tolstedt; Mark E. Brown

(57) ABSTRACT

A ground fleet operations quality management system for use with one or more vehicles which includes a gateway module mounted on each vehicle, a centralized data server to collect, store and pre-process data from multiple vehicles, and a web application designed to provide access to and analysis of the conditions of the entire fleet of vehicles.

19 Claims, 16 Drawing Sheets

Related U.S. Application Data 8,565,943, and a continuation-in-part of application No. 13/946,826, filed on Jul. 19, 2013.

(60) Provisional application No. 60/826,893, filed on Sep. 25, 2006, provisional application No. 61/674,216, filed on Jul. 20, 2012.

(51) Int. Cl.
*B60K 35/00* (2006.01)
*H04L 29/08* (2006.01)

(56) References Cited

U.S. PATENT DOCUMENTS

| | | |
|---|---|---|
| 3,081,557 A | 3/1963 | Mailhot |
| 3,631,496 A | 12/1971 | Fink et al. |
| 3,784,969 A | 1/1974 | Wilckens et al. |
| 4,226,491 A | 10/1980 | Kazama |
| 4,263,726 A | 4/1981 | Bolton |
| 4,276,029 A | 6/1981 | Gilson et al. |
| 4,380,024 A | 4/1983 | Olofsson |
| 4,442,491 A | 4/1984 | Olhausen |
| 4,470,116 A | 9/1984 | Ratchford |
| 4,527,980 A | 7/1985 | Miller |
| 4,644,494 A | 2/1987 | Muller |
| 4,694,119 A | 9/1987 | Groenewegen |
| 4,740,779 A | 4/1988 | Cleary et al. |
| 4,855,822 A | 8/1989 | Narendra et al. |
| 4,944,401 A | 7/1990 | Groenewegen |
| 5,123,538 A | 6/1992 | Groenewegen |
| 5,173,856 A | 12/1992 | Purnell et al. |
| 5,240,207 A | 8/1993 | Eiband et al. |
| 5,261,820 A | 11/1993 | Slye et al. |
| 5,272,652 A | 12/1993 | Rosenshein et al. |
| 5,438,162 A | 8/1995 | Thompson et al. |
| 5,594,286 A | 1/1997 | Tachikawa |
| 5,646,844 A * | 7/1997 | Gudat et al. ............... 701/409 |
| 5,742,336 A | 4/1998 | Lee |
| 5,750,925 A | 5/1998 | Purdom |
| 5,756,934 A | 5/1998 | Purdom |
| 5,826,206 A | 10/1998 | Nemeth |
| 5,865,624 A | 2/1999 | Hayashigawa |
| 6,052,792 A | 4/2000 | Mensch |
| 6,126,449 A | 10/2000 | Burns |
| 6,148,179 A | 11/2000 | Wright et al. |
| 6,160,998 A | 12/2000 | Wright et al. |
| 6,163,681 A | 12/2000 | Wright et al. |
| 6,167,238 A | 12/2000 | Wright |
| 6,167,239 A | 12/2000 | Wright et al. |
| 6,173,159 B1 | 1/2001 | Wright et al. |
| 6,219,618 B1 | 4/2001 | Bateman |
| 6,345,232 B1 | 2/2002 | Lynch et al. |
| 6,353,734 B1 | 3/2002 | Wright et al. |
| 6,363,632 B1 * | 4/2002 | Stentz et al. ............... 37/414 |
| 6,389,333 B1 | 5/2002 | Hansman et al. |
| 6,397,128 B1 | 5/2002 | Todd |
| 6,415,227 B1 | 7/2002 | Lin |
| 6,473,676 B2 | 10/2002 | Katz et al. |
| 6,480,152 B2 | 11/2002 | Lin et al. |
| D470,450 S | 2/2003 | Olzak |
| 6,634,885 B2 | 10/2003 | Hodgetts et al. |
| 6,671,648 B2 | 12/2003 | McCall et al. |
| 6,678,588 B2 | 1/2004 | He |
| 6,690,338 B1 | 2/2004 | Maguire |
| 6,721,640 B2 | 4/2004 | Glenn et al. |
| 6,762,942 B1 | 7/2004 | Smith |
| 6,792,353 B2 | 9/2004 | Lin |
| 6,816,715 B1 | 11/2004 | Mano |
| 6,822,161 B2 | 11/2004 | Komatsu et al. |
| 6,822,624 B2 | 11/2004 | Naimer et al. |
| 6,867,367 B2 | 3/2005 | Zimmerman |
| 6,879,875 B1 | 4/2005 | Hu et al. |
| 6,885,971 B2 | 4/2005 | Vock et al. |
| 6,898,492 B2 | 5/2005 | De Leon et al. |
| 6,915,206 B2 | 7/2005 | Sasajima |
| 6,988,591 B2 * | 1/2006 | Uranaka et al. ............... 187/247 |
| 7,020,708 B2 | 3/2006 | Nelson et al. |
| 7,023,695 B2 | 4/2006 | McCollum et al. |
| 7,117,135 B2 | 10/2006 | Cull et al. |
| 7,177,939 B2 | 2/2007 | Nelson et al. |
| 7,203,630 B2 | 4/2007 | Kolb et al. |
| 7,333,343 B2 | 2/2008 | Olzak |
| 7,356,389 B2 | 4/2008 | Holst et al. |
| 7,375,678 B2 | 5/2008 | Feyereisen et al. |
| 7,386,376 B2 | 6/2008 | Basir et al. |
| 7,624,943 B2 | 12/2009 | Cerchie et al. |
| 7,742,080 B2 | 6/2010 | Nakajima |
| 7,848,698 B2 | 12/2010 | Batcheller et al. |
| 7,881,914 B2 | 2/2011 | Trotta et al. |
| 8,081,921 B2 | 12/2011 | Batcheller et al. |
| 8,265,542 B2 | 9/2012 | Batcheller et al. |
| 8,355,834 B2 | 1/2013 | Duggan et al. |
| 2001/0036868 A1 | 11/2001 | Roy et al. |
| 2002/0035416 A1 | 3/2002 | De Leon |
| 2002/0093564 A1 | 7/2002 | Israel |
| 2003/0152145 A1 | 8/2003 | Kawakita |
| 2003/0195672 A1 | 10/2003 | He |
| 2003/0225492 A1 | 12/2003 | Cope et al. |
| 2004/0054512 A1 | 3/2004 | Kim et al. |
| 2004/0224740 A1 | 11/2004 | Ball et al. |
| 2005/0114627 A1 | 5/2005 | Budny et al. |
| 2005/0220055 A1 | 10/2005 | Nelson et al. |
| 2005/0246353 A1 | 11/2005 | Ezer et al. |
| 2006/0057974 A1 | 3/2006 | Ziarno et al. |
| 2006/0176651 A1 | 8/2006 | Olzak |
| 2006/0216674 A1 | 9/2006 | Baranov et al. |
| 2006/0227995 A1 | 10/2006 | Spatharis |
| 2007/0020588 A1 | 1/2007 | Batcheller et al. |
| 2007/0078579 A1 * | 4/2007 | Schricker et al. ............... 701/50 |
| 2007/0100516 A1 | 5/2007 | Olzak |
| 2009/0063031 A1 * | 3/2009 | Greiner et al. ............... 701/117 |
| 2009/0063226 A1 * | 3/2009 | Greiner et al. ............... 705/7 |
| 2009/0145974 A1 * | 6/2009 | Fekete ............... 239/11 |
| 2009/0147758 A1 | 6/2009 | Kumar |
| 2010/0092926 A1 | 4/2010 | Fabling |
| 2010/0149329 A1 | 6/2010 | Maguire |
| 2010/0231706 A1 | 9/2010 | Maguire |
| 2012/0215505 A1 | 8/2012 | Srivastav et al. |
| 2012/0299752 A1 | 11/2012 | Mahmoud et al. |
| 2013/0137415 A1 | 5/2013 | Takikawa |
| 2013/0171964 A1 | 7/2013 | Bhatia et al. |

FOREIGN PATENT DOCUMENTS

| | | |
|---|---|---|
| EP | 1053290 | 3/2003 |
| WO | 8503583 | 8/1985 |
| WO | 9104525 | 4/1991 |
| WO | 9104921 | 4/1991 |
| WO | 0160693 | 8/2001 |
| WO | 2004045106 | 5/2004 |
| WO | 2005031272 | 4/2005 |
| WO | 2005053524 | 6/2005 |
| WO | 2005053528 | 6/2005 |
| WO | 2007046831 | 4/2007 |

OTHER PUBLICATIONS

"International Search Report", PCT/CA03/01730, Mar. 29, 2004.
Sagetech, "Clarity/Clarity SV User Manual", available at http://www.sagetechcorp.com/client/Clarity%20User%20Manual.pdf, 2013, 1-24.
Wynbrandt, "SkyVision Xtreme", Plane and Pilot, Jul. 2011, pp. 54-55.

* cited by examiner

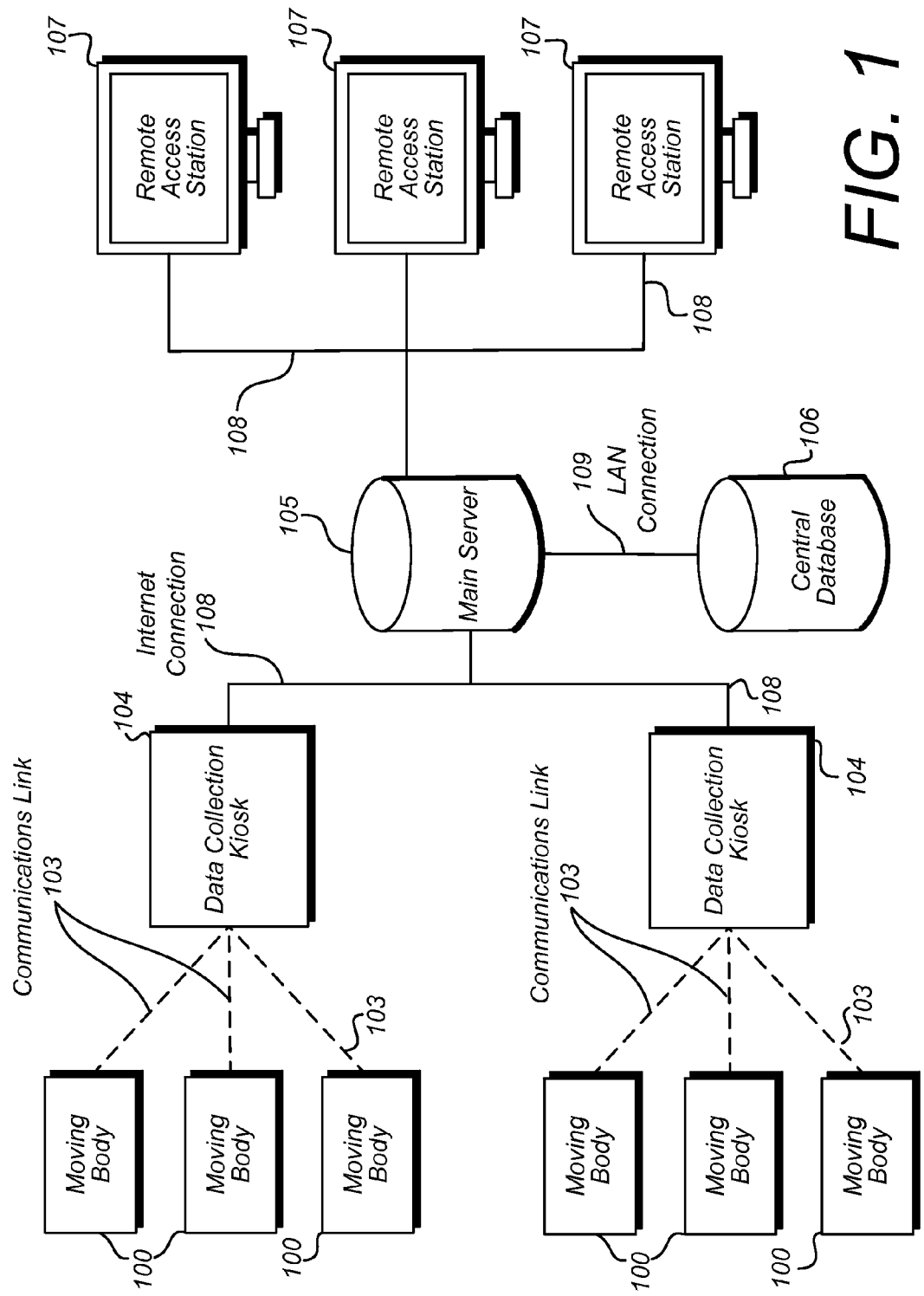

GROUND FLEET OPERATIONS QUALITY MANAGEMENT SYSTEM

CROSS-REFERENCE TO RELATED APPLICATIONS

This patent application is a continuation-in part of and claims priority in U.S. patent application Ser. No. 14/060,488, filed Oct. 22, 2013, now U.S. Pat. No. 9,047,717, issued Jun. 2, 2015, which is a continuation-in-part of and claims priority in U.S. patent application Ser. No. 11/903,112, filed Sep. 20, 2007, now U.S. Pat. No. 8,565,943, issued Oct. 22, 2013, which is nonprovisional of and claims priority in U.S. Provisional Patent Application No. 60/826,893, filed Sep. 25, 2006, and is also a continuation-in-part of and claims priority in U.S. patent application Ser. No. 13/946,826, filed Jul. 19, 2013, which is a nonprovisional of and claims priority in U.S. Provisional Patent Application No. 61/674,216, filed Jul. 20, 2012. The disclosures of the above-noted patent applications are incorporated by reference in their entirety herein.

BACKGROUND OF THE INVENTION

1. Field of the Invention

This invention pertains to a system/method for collecting operation parameters from a fleet of vehicles and, more particularly, to providing a system/method for the distribution, storage, and analysis of the collected data.

The present invention also relates generally to the field of ground vehicle tracking and information services, and more specifically to a system capable of receiving and processing transmissions from multiple information sources. For example, in aviation applications such data can include but are not limited to, automatic dependent surveillance-broadcast (ADS-B) towers, Very High Frequency Omni-Range (VOR) ground stations, and other aircraft.

2. Description of the Related Art

Various inventions and methods have been developed for gathering and analyzing operational data from a fleet of vehicles. Often these inventions depend on the use of data from a suite of highly-sophisticated sensors that is integrated into the vehicle. Other systems rely on the real-time wireless transmission of the captured data to a ground station or fleet terminal. These data acquisition systems depend on the analysis of the captured data, which must be done either on the vehicle, requiring a large amount of dedicated computing power to be integrated into the vehicle, or at a base station, requiring dedicated computing resources that must react to the data transmissions in real time.

U.S. Pat. Nos. 6,148,179, 6,160,998, 6,163,681, 6,167,239, 6,173,159, and 6,353,734 by Wright et al., and U.S. Pat. No. 6,167,238 by Wright, each describe a variation on a system that uses a wireless spread spectrum ground link-based system to communicate with aircraft. The common requirement for this group of patents is a system for sending data to or receiving data from an aircraft that depends on an on-board unit that obtains data from the aircraft and creates a communications link with a ground-based spread spectrum transceiver. The data collected from the aircraft can be transmitted to the ground-based transceiver whenever the aircraft is in communications range. This system works well for commercial aircraft such as passenger aircraft that routinely return to the location where the ground-based transceiver is set up, but is impractical and expensive for smaller flight operations or ground-based fleet operations.

U.S. Pat. Nos. 7,020,708, 7,177,939, and 8,250,221 by Nelson et al. each describe data communication services that utilize public wireless systems to facilitate communication between a moving body and one or more ground terminals. The systems described by Nelson et al. depend on the establishment of a radio communications path between the moving body and the ground terminals, and generally require the availability of public wireless systems. They normally will not work in areas where no wireless systems exist.

U.S. Pat. No. 7,203,630 and corresponding international publication WO 2004/045106 by Kolb et al. describe an aircraft flight data management system which collects aircraft data, formats it in the form of a binary or text file, and transmits the file via email to a ground station. This invention uses a rule-based software algorithm located in the aircraft as a means of determining when data should be sent via email to the ground station for analysis. This invention depends on a satellite or other wireless connection for the transmission of the email, as well as on the existence of a system with the email capability. These systems may be impractical and expensive for smaller flight operations or ground-based fleet operations.

U.S. Pat. No. 6,721,640 and corresponding international publication WO 01/60693 by Glenn et al. describe an event-based aircraft image and data recording system. Image data of various flight parameters is captured periodically during a flight and stored temporarily in a local memory buffer. When the system detects that certain pre-defined conditions exist based on an analysis of aircraft sensor data, a decision is made by the system to transfer the image data from the memory buffer to a separate storage device aboard the aircraft. This system depends on the presence of expensive imaging equipment on the aircraft. Image data, although potentially providing additional information for use in the investigation of an event such as the crash of an aircraft, is not a reliable means for capturing important flight data inasmuch as there are events such as wash-out caused by sunlight entering the camera wherein important flight data is lost. In addition, this is not a practical means for the storage and analysis of continuous data relating to the normal operation of an aircraft or other vehicle due to the excessive memory demands required by such a system, and the impracticability of reviewing this data for specific deviations from desired flight parameters.

U.S. Pat. No. 7,356,389 by Holst et al. describes a method and devices for wirelessly uploading and downloading data to and from a vehicle while it is in range of a coordinated network of vehicles. This invention, therefore, depends on the coordinated vehicle network, and will not reliably operate with a single vehicle or very small fleet of vehicles.

U.S. Pat. No. 6,397,128 by Todd describes a flight data recording system integrated with a flight data acquisition unit. This invention depends on the presence of an avionics standard communications bus to obtain data from external aircraft instrumentation subsystems. The flight data acquisition unit cannot itself sense or generate the flight data, but instead is dependent upon being tied into the avionics communications bus to obtain the data from other instruments that are tied into the bus. This invention cannot be used on aircraft or other vehicle types that lack a dedicated on-board communications bus.

U.S. Pat. No. 4,470,116 by Ratchford describes a digital flight data recording system that compares the actual recorded flight parameters to pre-defined optimum values based on an idealized model of an aircraft's flight schedule. The system creates a permanent record of the recorded data when the actual flight values differ significantly from the pre-defined optimum values. This system requires that each aircraft contain the computing platform necessary to store the pre-defined optimum values and to do the comparison.

Requiring a computing platform on each aircraft in a fleet is often prohibitively expensive. The comparison to pre-defined values on the aircraft optimizes memory usage; however, there is no mechanism to store data pertaining to the entire flight.

U.S. Pat. No. 7,620,374 by Ziarno et al. describes a system and method of transmitting data from an aircraft. The system depends on the use of a PC card that includes a radio transceiver for transmitting aircraft data into the skin of the aircraft, with radiates the radio signal to a remote location. This system is designed for use on larger aircraft with a large metallic outer surface area, such that the skin of the aircraft acts as a passive antenna for the transmission of data. This system is not designed for use on smaller aircraft and vehicles, such as helicopters, trucks, or automobiles.

The inventions described above describe various ways of capturing and/or analyzing operational data from a fleet of vehicles. Most of these inventions depend on the real-time transmission of data over a wireless link to a ground-based station. Some depend on the presence of a complicated ground-based communications system, or depend on being tied into existing aircraft or vehicle subsystems to enable data collection. None of the inventions above describe a low-cost, self-contained system that does not depend on data from existing vehicle subsystems and which is ideally suited to gather operational data for a fleet of vehicles scattered over multiple locations, and provide an analysis of this operational data at a central location on a day to day operational basis.

Automatic Dependent Surveillance-Broadcast, or ADS-B, is a surveillance technology for tracking aircraft that is part of the Next Generation (NextGen) Air Transportation System.

The system relies on two avionics components: a high-integrity GPS navigation source and a data link (ADS-B unit or receiver). There are several types of certified ADS-B data links, but the most common ones operate at 1090 MHz, essentially a modified Mode S transponder, or at 978 MHz (United States only).

ADS-B consists of two different services, "ADS-B Out" and "ADS-B In." "ADS-B Out" periodically broadcasts information about an aircraft, including identification, current position, altitude, and velocity, to the outside world, providing air traffic controllers with real-time position information typically more accurate than the information available with current radar-based systems. "ADS-B In" is the reception by aircraft of information including weather data, flight information, traffic avoidance information, and direct communication from nearby aircraft.

The ADS-B system can provide traffic and government generated graphical weather information through the TIS-B (Traffic Information Services-Broadcast) and FIS-B (Flight Information Services-Broadcast) applications.

The majority of aircraft operating within United States airspace will be required to be equipped with at least "ADS-B Out" by January of 2020. Because of this move toward the mandate of ADS-B equipped aircraft, it is seen as important to aviation electronics suppliers and pilots alike that an inexpensive, yet reliable system be available for implementation of the ADS-B functionality. Some suppliers are offering ADS-B solutions that interface with mobile computing devices such as an iPad, in order to provide a relatively inexpensive display for the system that is also capable of running applications and performing other tasks when not being used as an ADS-B display.

While using a mobile device such as an iPad is an innovative approach, the solution is not without its issues. Mobile devices run on battery power, and therefore often drop into "sleep" mode in order to conserve battery life. When the mobile device is in sleep mode, or when the ADS-B application (that is, the software application or program executing on the mobile device and performing the ADS-B functionality) is pushed into the background by another competing application running on the mobile device, the ADS-B application is likely not receiving broadcasts from the ADS-B system, and therefore may be missing important weather updates. When a pilot or other operator turns the mobile device on (or "wakes" it from sleep mode) to check the weather, he or she may have just missed a weather broadcast, or may have missed one almost 15 minutes earlier (the approximate broadcast rate of national weather updates), and so the weather display may be significantly out of date. The pilot could fly into inclement weather he or she cannot see on the erroneous (not updated) display.

What is needed in the art is a system that is capable of caching multiple generations of broadcast data (including but not limited to ADS-B weather broadcasts), providing access to those multiple generations of data or to a selected subset thereof to a mobile device upon request by the mobile device, a means for displaying the data or data subset on the mobile device either as still imagery or as an animation, and a means for automatically detecting when the mobile device has "awakened" or turned on and transmitting cached broadcast data to the mobile device upon wake up such that it is displayed in a useable manner.

SUMMARY OF THE INVENTION

Accordingly, it is one objective of the invention to describe a fleet operations quality management system for use with one or more vehicles which includes a separate data recording unit mounted on each vehicle, a remotely located data processing or collection device to collect, store and pre-process data from the vehicles, a centralized data storage and retrieval system designed to accept and assimilate recorded trip data, and a web application designed to provide access to and operator analysis of the recorded trip data.

It is another objective of the invention to describe a data recording unit that is part of a fleet operations quality management system which can be operated as a self-contained unit with integrated sensors and does not require being tied into a specific vehicle or system platform, thereby providing utility in any type of vehicle or moving body.

It is another objective of the invention to describe a data recording unit that is part of a fleet operations quality management system which can be operated as a self-contained unit, and which also uses industry standard communications protocols to accept information generated by existing on-vehicle subsystems.

It is another objective of the invention to describe a method of fleet data acquisition in which navigational data is captured by a self-contained data recording unit mounted on a moving body and stored both in the data recording unit's internal memory and in a separate memory subsystem mounted on the same moving body, from which it may be transmitted an indefinite amount of time later to an external computer system for processing and display.

It is another objective of the invention to describe a method of fleet data acquisition in which the captured navigational data includes information collected from both the sensors integrated into the mobile data recording unit itself and from external subsystems already located on the moving body.

It is another objective of the invention to describe a method of storing navigational data captured by a mobile data recording unit in both the internal memory of that mobile data recording unit, and redundantly on a portable memory device located in the remote memory subsystem, where the copy of the data internal to the mobile data recording device serves as a backup in case the portable memory device is lost, tampered with, or otherwise potentially deficient in at least some manner.

It is another objective of the invention to describe a means of processing and displaying the information received from one or more self-contained data recording units mounted on one or more moving bodies by providing an Internet-based data analysis program.

A first aspect of the invention is generally embodied by a method for monitoring vehicle behavior. Consider the case where a vehicle is operated over a period of time and which may be characterized as a trip. Raw sensor data that relates to such a trip (raw sensor trip data) is stored on a remote data storage system that is mounted on the vehicle. This raw sensor trip data from the on-vehicle remote data storage system is transmitted to a data processing device or data collection kiosk that is located "off-vehicle." That is, the data processing device is not structurally interconnected with the vehicle in any manner, and thereby does not move along with the vehicle.

The noted transmission of the raw sensor trip data is initiated at some point in time after raw sensor trip data is no longer being actively stored on the remote data storage system. Stated another way, this transmission of the raw sensor trip data is initiated only after all desired raw sensor trip data has been stored on the remote data storage system. Stated yet another way, raw sensor trip data is not transmitted in real-time to the off-vehicle data processing device.

The raw sensor trip data is transformed into a trip file by the data processing device after it has received this raw sensor trip data from the remote data storage system. This processed trip file, which is indicative of a behavior of the vehicle during the trip, is then transmitted from the data processing device to a server. The trip file is compared with a desired trip profile that is stored on the server, where this comparison is for purposes of identifying each deviation in the trip file. A deviation, which is sometimes referred to as an exceedance, is an instance where the actual trip file fails to comply with the desired trip profile. Since a trip file may deviate from its associated trip profile in a number of instances, a given trip file may in fact have multiple deviations. In any case, information on each deviation is transmitted to a first location, where information on at least some of the deviations is then displayed.

Various refinements exist of the features noted in relation to the first aspect of the invention. Further features may also be incorporated in the first aspect of the invention as well. These refinements and additional features may exist individually or in any combination. The first aspect may be used in relation to any appropriate type of vehicle, including without limitation an airplane, a helicopter, a glider, a truck, a car, watercraft (e.g., a boat), unmanned aircraft, unmanned ground vehicles, or the like. A "trip" in accordance with the first aspect may be of any appropriate duration and may be defined in any appropriate manner. For instance, a trip may be a pre-defined delivery route, may coincide with any and all travel of the vehicle that occurs over a certain time period (e.g., during a given shift), or may coincide with any and all travel of the vehicle between a certain starting location and a certain end destination.

The remote data storage system may be mounted on the vehicle in any appropriate manner (e.g., via a detachable interconnection such that the remote data storage system may be readily installed and removed from the vehicle), may be installed at any appropriate location on the vehicle (including on an interior or exterior of the vehicle), or both. In one implementation, any operative interconnection between the remote data storage system and the vehicle is limited to a power and ground connection. For instance, the remote data storage system may not have any operative interconnection with the vehicle (i.e., no exchange of signals therebetween), or a single operative interconnection may exist between the remote data storage system and the vehicle in the form of the vehicle providing electrical power for the remote data storage system. In one implementation, the interconnection between the data storage system and the vehicle is limited to a power and ground connection.

At least some of the raw sensor trip data that is stored on the remote data storage system may be acquired by a separate remote data recording unit. In one implementation, the electronics of the remote data recording unit is more sealed than the electronics of the remote data storage system (e.g., the remote data storage system may be more susceptible to environmental conditions than the remote data recording unit), hence it is desirable to separate the remote data storage system from the remote data recording unit in order to minimize cost of replacement of the data storage system. This remote data recording unit may be mounted on the vehicle in any appropriate manner (e.g., via a detachable interconnection such that the remote data recording unit may be readily installed and removed from the vehicle), may be installed at any appropriate location on the vehicle (including on an interior or exterior of the vehicle), or both. In one implementation, any operative interconnection between the remote data recording unit and the vehicle is limited to a power and ground connection (e.g., the remote data recording unit may use power from the vehicle). This may be a particularly desirable feature when it may be an issue to "tie" the remote data recording unit into one or more systems of a vehicle for one reason or another. For instance, the remote data recording unit may not have any operative interconnection with the vehicle (i.e., no exchange of signals therebetween), or a single operative interconnection may exist between the remote data recording unit and the vehicle in the form of the vehicle providing power for the remote data recording unit. However, the remote data recording unit could operatively interface with one or more systems of the vehicle if desired/required.

The remote data storage system and the above-noted remote data recording unit may be mounted at different locations on the vehicle. Another option would be for the remote data recording unit to be mounted to the vehicle and for the remote data storage system to be mounted to the remote data recording unit, or vice versa. Yet another option would be to incorporate the remote data storage system into the remote data recording unit (i.e., the remote data recording unit itself may be the remote data storage system of the first aspect). That is, the remote data recording unit may acquire and then store the raw sensor trip data, and the raw sensor trip data may be transmitted directly from the remote data recording unit to the data processing device in any appropriate manner (e.g., via a removable/portable memory device; via wireless transmission, for instance when the vehicle comes within sufficient proximity of the data processing device).

The above-noted remote data recording unit may include a low-end processor and a plurality of sensors that are each disposed within a common housing. In one implementation, these sensors include at least three accelerometers, at least three gyroscopes, and a GPS module (other sensing components could be used as well, such as a three-axis compass, one or more barometric pressure sensors, or the like). As such, the remote data recording unit may acquire raw sensor trip data related to a trip, and this raw sensor trip data may be transmitted from the remote data recording unit to the remote data storage system in any appropriate manner (e.g., via any appropriate communications link), or alternatively from the remote data recording unit to the data processing device as noted above. It may be such that a transmission of the raw sensor trip data from the remote data storage system to the off-vehicle data processing device may not be initiated until the transmission of raw sensor data from the remote data recording unit to the remote data storage system has been terminated.

The above-noted remote data recording unit may include a first memory that is also disposed within the housing, along with the low-end processor and plurality of sensors. Raw sensor trip data acquired by the remote data recording unit on a trip may be stored on this first memory, in addition to being transmitted to another remote/on-vehicle data storage system. Having this second set of raw sensor trip data may be beneficial in the event that there is a defect of some type with the raw sensor trip data that is transmitted from the remote data storage system to the data processing device.

Other benefits may be associated with having multiple copies of the raw sensor trip data of each trip. For instance, having multiple copies may be beneficial in determining if the raw sensor trip data provided to the data processing device has been previously tampered with in some manner. Consider the case where raw sensor trip data on multiple trips is stored on the remote data storage system. Each such trip may have an associated identifier, and these identifiers may be sequentially numbered. If a determination is made by the data processing device that the raw sensor trip data from a given remote data storage system is missing a trip that should be in the sequence, an indication of this condition may be conveyed and the raw sensor trip data on at least any such missing trip (or the raw sensor data on each trip) may then be retrieved from the memory of the remote data recording unit for analysis. Other ways to identify raw sensor trip data that has been subject to potential tampering may be utilized. Moreover, one or more ways for assessing whether the raw sensor trip data of each trip is otherwise "valid" (e.g., not corrupt) may be utilized.

The remote data recording unit may be of a rather inexpensive configuration. For instance, a relatively "low-end" processor may be utilized by the remote data recording unit. A "low-end" processor is defined as a usually low cost processor with limited computational power, as would be obvious to one skilled in the art. In one implementation, the data recording unit contains a low-end processor, and no processing of the raw sensor trip data is undertaken by the data recording unit. Instead, all processing of the raw sensor trip data may be executed by the off-vehicle data processing device containing a "high-end" processor. A "high-end" processor is defined as a processor similar to that found in any modem desktop computing platform, as would be obvious to one skilled in the arts. For instance, the raw sensor trip data may be transmitted from the remote data recording unit in an un-calibrated state (e.g., to the remote data storage system; to the off-vehicle data processing device). In any case, the low-end processor of the remote data recording unit is subject to a number of characterizations, which may apply individually or in any combination: 1) the low-end processor of the remote data recording unit may be configured so as to have no more than about 1 percent of the processing power of the high-end processor contained in the data processing device in one implementation, no more than about 0.5 percent of the processing power of the high-end processor contained in the data processing device in another implementation, and no more than about 0.1 percent of the processing power of the high-end processor contained in the data processing device in yet another implementation; 2) the low-end processor of the remote data recording unit may be in the form of no more than an 8-bit microprocessor; and 3) the low-end processor of the remote data recording unit may be configured to handle no more than about 20 million operations per second (i.e., 20 MIPS). The characterizations that have been presented in relation to the low-end processor of the remote data recording unit are equally applicable to any processor that may be utilized by the remote data storage system to control/facilitate data storage operations (including where both a remote data recording unit and another remote data storage system are used).

The raw sensor trip data from the remote data storage system may be transmitted to the data processing device in any appropriate manner, and any appropriate number of trips may be transmitted to the data processing device at any one time. For instance, the raw sensor trip data may be wirelessly transmitted from the remote data storage system to the data processing device, for instance when the vehicle comes within sufficient proximity to the off-vehicle data processing station (e.g., when the vehicle returns to its home-base, terminal, or the like). Another option is for the remote data storage system to utilize a removable or portable memory device of any appropriate type (e.g., removable magnetic disk, CD, memory stick). In this case, the portable memory device may be manually removed from the remote data storage system and physically transported in any appropriate manner to the data processing device, where the portable memory device and data processing device may then be operatively interconnected in any appropriate manner. After the raw trip data has been downloaded from the portable memory device, the data processing device may be configured to re-format the same for subsequent data recordation operations. More than one trip could be stored on the portable memory device.

The data processing device may be of any appropriate type, such a personal computer or the like. The data processing device may transform the raw sensor trip data into a trip file in any appropriate manner. Raw sensor trip data for different vehicle trips are preferably segregated into separate trip files. In any case, the noted transformation function may include calibrating all raw sensor trip data in any appropriate manner. In one implementation, this transformation may also include what may be referred to as a "sensor fusion" operation. For the purposes of this discussion, "sensor fusion" shall be defined as any data transformation process which takes in raw sensor trip data (raw sensor values) containing multiple and redundant sources of at least some of the trip parameters and combines them mathematically to create a value that is more complete and/or accurate than any single source of data would have been alone. For instance, the transformation function provided by the data processing device may include deriving a first operational parameter using each of first and second techniques, and combining an outcome from each of these first and second techniques (e.g., for acquiring more reliable attitude information).

Further accuracy can be obtained by performing the sensor fusion task only after the entire trip has been completed (i.e., post-processing of the data, not real-time processing). By performing sensor fusion on a completed set of raw sensor trip data, the sensor fusion algorithms not only rely on the data parameters for a given point in time, but can also "look into the future" by accessing sensor values that were acquired chronologically after the "current" values being examined. By looking ahead in the data stream, the sensor fusion algorithms are better able to determine which sensor values may have been erroneous at any given time and eliminate them from the calculations.

The trip file may be transmitted from the data processing device to the server (e.g., a computer of any appropriate configuration) in any appropriate manner. For instance, the data processing device and the server may communicate over a local area computer network (LAN) or a public computer network (e.g., the Internet). Similarly, the information on each deviation associated with the trip file may be transmitted from the server to the first location in any appropriate manner. For instance, the server and a remote access station (e.g., a personal computer; a desktop computer; a laptop computer; a "dumb" terminal) at the first location may communicate over a computer network, such as a public computer network (e.g., the Internet). A web application may be used to view deviations as well.

A "trip profile" may be defined in any appropriate manner. For instance, a trip profile may be viewed as a combination of one or more rules or limits relating to the operation of the vehicle (e.g., operational boundaries, for instance to address safety issues). Exemplary rules for trip profiles include without limitation an acceleration limit, a velocity limit, a vertical takeoff speed limit, a minimum altitude limit, a minimum remaining fuel limit, or the like.

A trip profile may vary from vehicle type to vehicle type (e.g., a trip profile for a delivery truck may vary significantly from a trip profile for a cab; a trip profile for a commuter airplane may vary significantly from a trip profile for an aerial crop spraying service that uses a different type of airplane). A different trip profile may also exist for the same vehicle type. Consider the case where the first aspect is employed by two different aerial crop spraying companies that use the same model airplane. Company A may choose to implement one trip profile for its airplane sprayers limiting maximum spraying speed, while Company B may choose to implement a different trip profile for its airplane sprayers limiting minimum spraying speed.

The information on one or more deviations associated with the trip file may be displayed at the first location in any appropriate manner, such as on a graphical user interface, computer monitor, or the like. A web application may be used in relation to this display of information on one or more deviations. For instance, the above-noted remote access station at the first location may access the server and obtain deviation information through a web application. In any case and in one implementation, a listing of each deviation associated with a particular trip may be displayed at the first location. Preferably, this listing provides sufficient information to appropriate personnel at the first location (e.g., an operations manager or supervisor) to understand what rule or limit was violated during the relevant trip. Additional information may be provided with each displayed deviation, such as the information that at least in effect identifies which vehicle is associated with the deviation. This is particularly relevant for when the first aspect is used to monitor a vehicle fleet as will be discussed in more detail below.

The ability to retrieve an entire trip profile at the first location by selecting a displayed deviation may be accommodated by the first aspect. In one implementation, the trip profile may be used to generate a three-dimensional graphical representation of the trip (e.g., via a display of a remote access station at the first location). For instance, selecting a listed deviation may result in the generation of a 3D display of the vehicle at the point in the trip where the deviation occurred and with the vehicle being in the orientation at the time of the occurrence of the deviation (e.g., derived through the raw sensor trip data). Corresponding 3D topographical information may be displayed at this time as well. The entirety of the corresponding trip may be displayed through selection of a displayed deviation as well, along with providing one or more tools for reviewing the trip in one or more manners.

The first aspect may be used in relation to monitoring a single vehicle. More typically, the first aspect will be implemented to monitor a fleet of vehicles. Deviation information may be presented on a vehicle-by-vehicle basis. Alternatively, deviation information on the entire vehicle fleet may be presented in a cumulative listing (e.g., deviations over a desired/input time frame; deviations which have occurred since the last time the server was accessed), although this cumulative listing could also be indexed by vehicle.

A second aspect of the invention is embodied by a vehicle behavior monitoring system that includes a remote data recording unit, a data processing device or data collection kiosk, a server, and a remote access station. The remote data recording unit may be mounted to the vehicle, is configured to acquire raw sensor data relating to a trip by the vehicle (e.g., "raw sensor trip data"), and further is configured to store this raw sensor trip data at an on-vehicle storage location. The data processing device is not located on the vehicle, and thereby may be referred to as being "off-vehicle." The data processing device is configured to receive raw sensor trip data from the on-vehicle storage location, and further is configured to transform the raw sensor trip data into a trip file. The server is at a different location than, and is in communication with, the data processing device. Moreover, the server is configured to receive the trip file from the data processing device, and further is configured to identify each deviation in the trip file, where a deviation is in accordance with the discussion presented above in relation to the first aspect. The remote access station is in communication with the server such that a listing of each deviation in the trip file may be viewed at the remote access station.

Various refinements exist of the features noted in relation to the second aspect of the invention. Further features may also be incorporated in the second aspect of the invention as well. These refinements and additional features may exist individually or in any combination. Initially, the details set forth above in the first aspect with regard to vehicle types, trips, and deviations are equally applicable to this second aspect. Moreover, the various features discussed above in relation to certain components used by the first aspect are equally applicable to the corresponding component(s) of this second aspect. Additional components discussed above in relation to the first aspect may be used by this second aspect as well.

A third aspect of the invention is embodied by a vehicle behavior monitoring system that includes a plurality of vehicles that may be characterized as a vehicle fleet or the like, a plurality of remote data recording units, a data processing device, and a remote access station. Each remote data recording unit is configured to acquire raw sensor data relating to a trip of its corresponding vehicle ("raw sensor trip data"), and to store this raw sensor trip data at an on-vehicle storage location. The data processing device is not located on any of the vehicles in the fleet, and thereby may be referred to as being "off-vehicle." The data processing device is configured to receive raw sensor trip data from the on-vehicle storage location of each vehicle, and further is configured to transform raw sensor trip data into a separate trip file on a vehicle-by-vehicle basis. A listing of each deviation associated with each trip file may be viewed at the remote access station.

Various refinements exist of the features noted in relation to the third aspect of the invention. Further features may also be incorporated in the third aspect of the invention as well. These refinements and additional features may exist individually or in any combination. Initially, the details set forth above in the first aspect with regard to vehicle types, trips, and deviations are equally applicable to this third aspect. Moreover, the various features discussed above in relation to certain components used by the first aspect are equally applicable to the corresponding component(s) of this third aspect. Additional components discussed above in relation to the first aspect may be used by this third aspect as well.

A fourth aspect of the invention is embodied by a system/method for collecting information on a fleet of vehicles. A mobile data recording unit and remote memory subsystem are associated with a movable body so that the mobile data recording unit and remote memory subsystem move along with the movable body. Data may be acquired from any appropriate number of sources (e.g., from other data recording units; other sensors) and transmitted to the remote memory subsystem in any appropriate manner (e.g., via a common communications bus). The mobile data recording unit and remote memory subsystem may or may not be co-located in the movable body, but are in either case operatively connected to each other for the purpose of exchanging data. Data regarding a trip of the movable body (e.g., position, attitude, airspeed, barometric pressure, outside air temperature, torque via an appropriate sensor) are sensed/acquired by the mobile data recording unit and stored in its internal memory. A redundant copy of the same captured data is sent to the remote memory subsystem for temporary storage. Multiple trips of the movable body can be recorded in this manner. Data is transferred from the remote memory subsystem to a remote data collection device located outside of the movable body after one or more trips of the movable body have been recorded. The remote data collection device may be located at a site common to multiple movable bodies, such as a fleet terminal, and stores data regarding multiple movable bodies. In addition to storing the trip data of multiple movable bodies, the remote data collection device is capable of processing the data in preparation for later use by the centralized data storage and retrieval system. At periodic intervals or otherwise, collected, processed data is transferred from the remote data collection device to the centralized data storage and retrieval system, where it is further processed and made available for display using an internet-based software application.

A fifth aspect of the invention is embodied by a system/method for collecting information on a fleet of land vehicles, such as a fleet of agricultural vehicles. A mobile data recording unit is associated with a movable body (such as a tractor or combine) so that the mobile data recording unit moves along with the movable body. Data may be acquired from any appropriate number of sources (e.g., from other data recording units; other sensors) and stored in the mobile data recording unit. Data regarding a trip of the movable body (e.g., position, orientation, ground speed, weather conditions, etc.) are sensed/acquired by the mobile data recording unit. Multiple trips and or operations of the movable body can be recorded in this manner.

Stored data may be transferred from the mobile data recording unit to a remote data collection device located outside of the movable body after one or more trips or operations of the movable body have been recorded. The remote data collection device may be located at a site common to multiple movable bodies, such as a fleet terminal or farmyard, and stores data regarding multiple movable bodies. In addition to storing the trip data of multiple movable bodies, the remote data collection device is capable of processing the data in preparation for later use by the centralized data storage and retrieval system. At periodic intervals or otherwise, collected, processed data is transferred from the remote data collection device to the centralized data storage and retrieval system, where it is further processed and made available for display using an internet-based software application.

Alternately, stored data may be transmitted via an appropriate wireless communications protocol (such as cellular or satellite communications) to a cloud server, where the cloud server serves the function of the remote data collection device described above, that is processed for later use by the centralized data storage and retrieval system. Also, the stored data on the cloud server may be made available to other, external applications such as service providers, where the data from multiple fleets may be combined together and analyzed to identify trends in an entire region represented by multiple fleets. The external applications may also use the data stored in the cloud server to predict upcoming service needs, such as the delivery of more fuel, the replacement of a part that is detected as going bad, or communications to another remote operator that assistance is needed (calling a grain truck to unload a full combine harvester, for example, or a farmyard that additional seed is needed for a planting operation).

Further objectives and advantages of the invention will become apparent from a consideration of the drawings and ensuing description.

BRIEF DESCRIPTION OF THE DRAWINGS

FIG. 1 is a system-level schematic of one implementation of a fleet operations quality management system.

DETAILED DESCRIPTION OF THE PREFERRED EMBODIMENTS

Figure 1A:
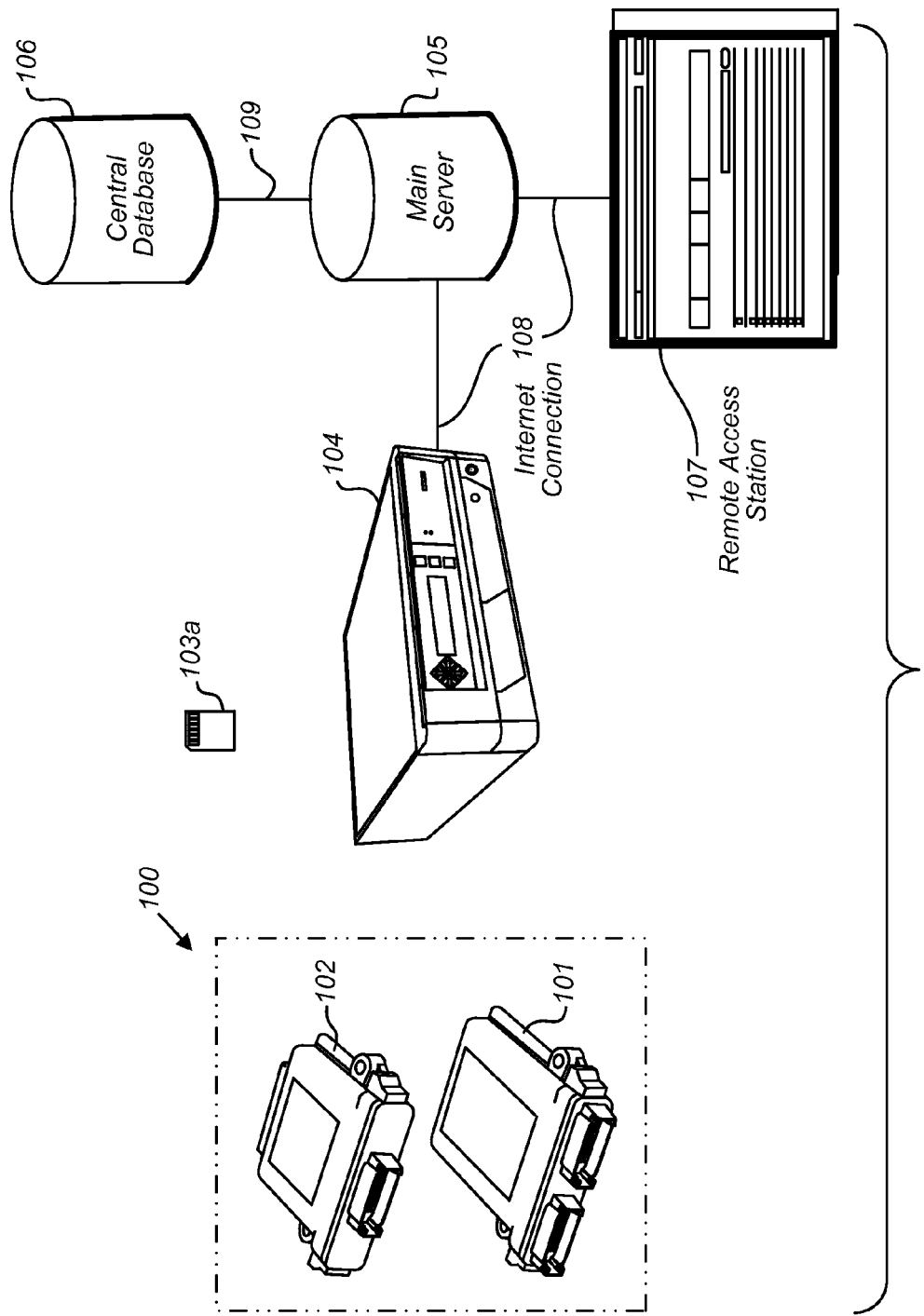
FIG. 1A is a perspective view of one implementation of certain components that may be used by the fleet operations quality management system of FIG. 1.

FIG. 1 shows one implementation of a fleet operations quality management system. Data is captured from multiple instances of moving bodies 100 (e.g., trucks, automobiles, aircraft (e.g., airplanes, gliders), watercraft (e.g., boats), unmanned aircraft, unmanned ground vehicles, or any other vehicle in a vehicle fleet) and transferred to one of a number of what may be characterized as one or more data processing devices, computers, or data collection kiosks 104 via an appropriate communications link 103 (e.g., a portable memory device, a wireless data connection). A single data collection kiosk 104 can serve and collect data from any appropriate number of moving bodies 100, and thereafter process this data in a manner that that will be discussed in more detail below. The fleet operations quality management system may use any appropriate number of data collection kiosks 104, and each data collection kiosk 104 may be used in relation to any appropriate number of moving bodies 100. Data captured on the moving bodies 100 is stored in the form of raw data; that is, readings captured directly from sensors on the moving bodies 100 and not processed in any fashion. Once the raw data is received by a particular data collection kiosk 104 regarding a particular trip by a particular moving body 100, it is processed; that is, the raw sensor values are processed in at least some manner (e.g., calibrated, evaluated, compared, and/or combined together using algorithms on the data collection kiosk 104) to produce what may be characterized as processed navigational data or a trip file (e.g., having an enhanced accuracy). This trip file (a processed collection of raw sensor data on a trip by a vehicle) is sent in any appropriate manner to a main server 105, such as via an Internet connection 108 or via any other appropriate communications link. In one implementation, the trip file may be queued for later transmission to the main server 105 during off-peak hours. In any case, the main server 105 evaluates the trip file and sends it for archiving in a central database 106 via a local area network (LAN) 109 or via any other appropriate communications link. A remote access station 107 (e.g., a terminal, a laptop computer, a desktop computer, a "dumb terminal," or the like) may be used to view a particular trip file stored on the main server 105. The remote access station 107 may also be used to view a particular trip file archived in the central database 106 by querying the main server 105 to retrieve the file from the central database 106. Any appropriate number of remote access stations 107 may be operatively interconnected with the main server 105.

A collection of moving bodies 100 (e.g., vehicles) may be characterized as a fleet (e.g., a vehicle fleet) in relation to the fleet operations quality management system of FIG. 1. A fleet may be defined by any appropriate number of moving bodies 100, any appropriate number of data collection kiosks 104 may be used by any given fleet, any appropriate number of remote access stations 107 may be used in relation to any given fleet, and any appropriate number of remote access stations 107 may be used in relation to each fleet, all in relation to the fleet operations quality management system of FIG. 1. The fleet operations quality management system of FIG. 1 may be used in relation to any appropriate number of fleets (e.g., the main server 105 may be configured to service a single fleet, or alternatively the main server 105 may be configured to service any appropriate number of multiple fleets). For instance, the fleet operations quality management system of FIG. 1 could be used in relation to a single fleet or in relation to multiple fleets.

FIG. 1A shows one implementation of certain components that may be used by the fleet operations quality management system of FIG. 1, showing the flow of data from a single instance of a moving body 100 shown in FIG. 1 through the system to display on a remote access station 107. What may be characterized as a remote or mobile flight recorder, mobile data recording unit, or mobile sensor data recording unit 101 is mounted in any appropriate manner on a moving body 100 and is used to capture data about the movement and operation of the moving body 100. The data is sent from the mobile data recording unit 101 to a remote data storage system or remote memory subsystem 102 which is also mounted in any appropriate manner on the moving body 100, where this data may be stored indefinitely for later extraction. In one implementation, each of the mobile data recording unit 101 and the remote memory subsystem 102 are detachably mounted to the moving body 100 (although again any mounting technique may be utilized), but in any case preferably each are at least substantially maintained in a stationary or fixed position relative to the moving body 100. When one or more trips have been completed by the moving body 100, the data may be transferred from the remote memory subsystem 102 to a data collection kiosk 104 in any appropriate manner (e.g. via a portable memory device 103a as shown in FIG. 1A, via a wireless transmission device). The data collection kiosk 104 may be at any appropriate location, such as a central location in the form of an aircraft or truck terminal or a "home base" for a fleet of the moving bodies 100. The data collection kiosk 104 may be in the form of a personal computer or the like, and is used because of the inherent processing power found in a personal computer. The data collection kiosk 104 performs the bulk of the processing of the data that has been captured and downloaded by the mobile data recording unit 101 and remote memory subsystem 102, thereby allowing the mobile data recording unit 101 and remote memory subsystem 102 to use lower-cost, low-performance "low-end" processors used only for acquisition of raw sensor data. The data collection kiosk 104 processes the raw data retrieved from the remote memory subsystem 102 (preferably, on a trip-by-trip basis, such that the identity of the raw data on each trip is maintained). The data collection kiosk 104 then may queue the processed data for later transmission to a main server 105 over an Internet connection 108 as previously noted.

The main server 105 may be installed at any appropriate location, such as a central location or the like in the form of a company headquarters. The main server 105 may communicate with one or more data collection kiosks 104 associated with a single fleet operation (e.g., a single company), or may communicate with one or more data collection kiosks 104 for each of multiple fleet operations (e.g., multiple companies). The main server 105 analyzes the data received from the data collection kiosk 104 (e.g., the above-noted trip file). Data items from each recorded trip are compared against established trip profiles to determine if the moving body 100 for which the data was recorded performed outside of its acceptable performance ranges. These trip profiles consist of a set of rules against which each recorded trip or trip file is measured. If a trip file is shown to have broken one of the established rules for the corresponding trip profile, a "deviation" is said to have occurred. Trip files which are shown to contain one or more deviations are marked for later review by a user of the fleet operations quality management system. Trip files with one or more deviations are sent via an Internet connection 108 for display on one or more remote access stations 107 (e.g., via a web application). All trip files with no deviations (non-event trip files) are sent via a LAN connection 109 for archiving and further processing in a central database 106. A user of the fleet operations quality management system can download and review the trip files containing one or more deviations using a remote access station 107 (e.g., via a web application), and can also use a remote access station 107 (e.g., via a web application) to retrieve non-event trip files from the central database 106, as well, by sending a request to the main server 105 to retrieve the archived non-event trip file from the central database 106. The fleet operations quality management system could be configured so that the trip files with one or more deviations are automatically sent to the relevant remote access station(s) 107 (e.g., via a web application), the system could be configured so that the trip files with one or more deviations can be retrieved through the remote access station(s) 107 (e.g., via a web applications) by logging onto the main server 105, or both. Access to the trip files stored on the main server 105 and/or central database 106 may be appropriately controlled as desired/required, for instance if the fleet operations quality management system of FIG. 1 is handling multiple fleet operations (e.g., being used in relation to fleets for multiple organizations or companies).

In addition to using a remote access station 107 (e.g., via a web application) to download and review deviations and trip files, a user of the fleet operations quality management system may use a remote access station 107 (e.g., via a web application) to define any appropriate number of trip profiles. In this regard, a remote access station 107 (e.g., via a web application) may be used to define one or more rules for a desired trip profile. These trip profiles may vary depending upon the type of moving body 100, may vary from fleet operation to fleet operation, or both (e.g., different companies may wish to employ different requirements for the same type of moving vehicle 100, even when used for the same application). Examples include a trip profile for a commercial aircraft delivering goods to an off-shore oil platform, to a land-based trip profile for a commercial delivery truck following in-town routes. A typical rule for a flight-based trip profile may include a minimum altitude that must be maintained while over populated areas, while a similar rule would be meaningless for a land-based delivery truck.

Figure 1B:
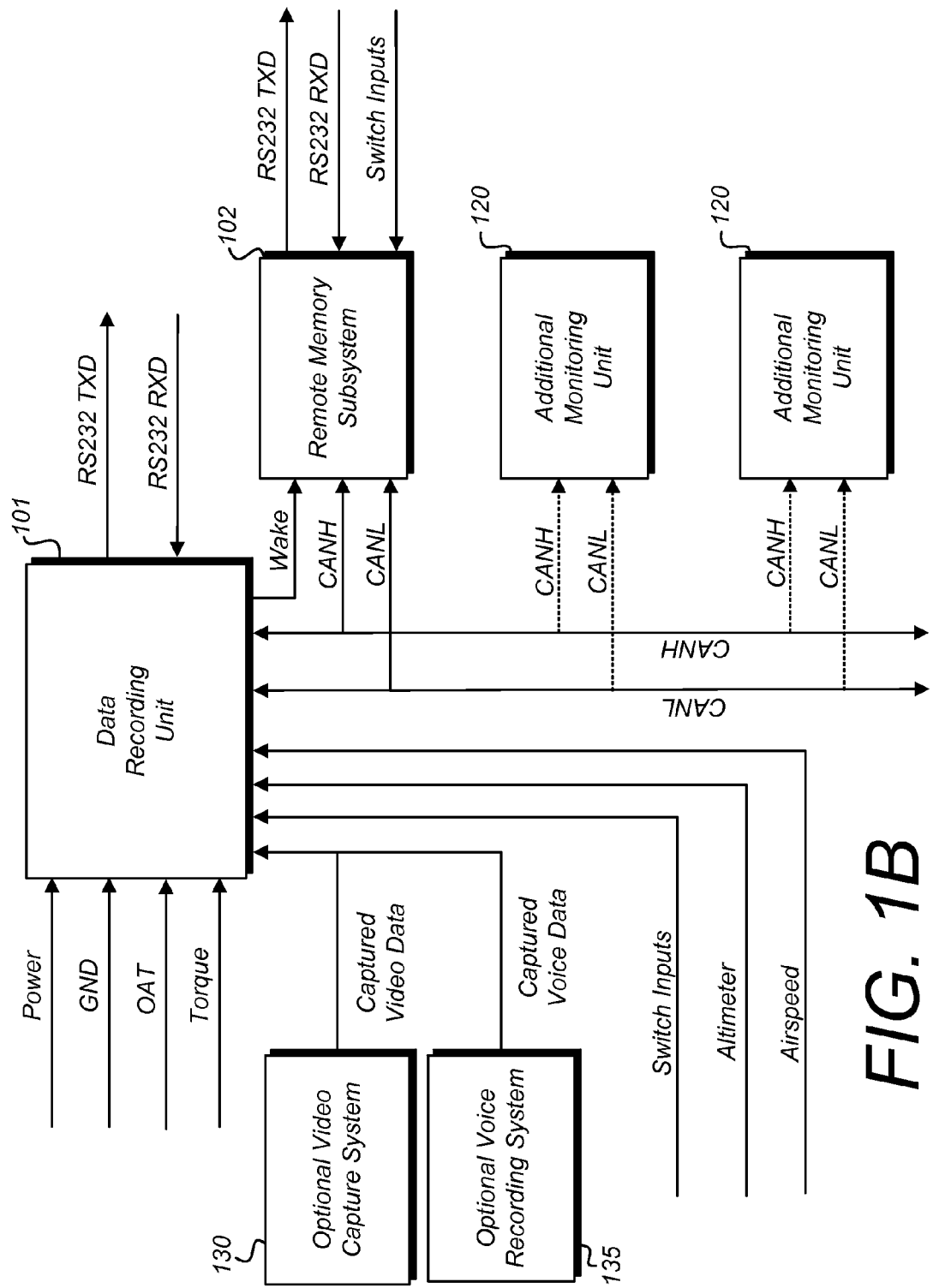
FIG. 1B is a system-level block diagram of one implementation of data acquisition/storage components that may be used by the fleet operations quality management system of FIG. 1.

FIG. 1B is a block diagram of one implementation of a data recording subsystem that is placed on a moving body 100 to record navigational data for the fleet operations quality management system shown in FIG. 1. A mobile data recording unit 101 is operatively interconnected to a remote memory subsystem 102 via an industry standard communications bus or by any other appropriate communications link. The mobile data recording unit 101 has integrated sensors to allow it to generate data about the movement of the moving body 100 through space. In a preferred implementation, the sensors integrated into the mobile data recording unit 101 are alone sufficient to collect the desired/required data, allowing the fleet operations quality management system to be used on any type of moving body 100. In an alternate implementation, however, the mobile data recording unit 101 can also accept signals from external subsystems already on the moving body 100. In the implementation shown in FIG. 1B, the mobile data recording unit 101 accepts power and ground from any appropriate power source (e.g., an internal battery, power from the moving body 100, or another external source). Optionally, the mobile data recording unit 101 is capable of receiving signals from various external sensor devices. In one implementation, these external sensors include an outside air temperature (OAT) sensor, a rotor torque sensor, operator switch inputs, and altimeter and airspeed signal inputs. The mobile data recording unit 101 can also exchange information with external subsystems via a standard serial communications connection or by any other appropriate communications link.

The mobile data recording unit 101 could be in the form of any of the mobile flight recorder or mobile data recording unit disclosed in any of U.S. Patent Application Ser. No. 60/701,736, filed on Jul. 22, 2005, and entitled "LOW-COST FLIGHT TRAINING AND SYNTHETIC VISUALIZATION SYSTEM"; U.S. patent application Ser. No. 11/327,965, filed on Jan. 9, 2006, and entitled "LOW-COST FLIGHT TRAINING AND SYNTHETIC VISUALIZATION SYSTEM AND METHOD"; and PCT Patent Application Serial No. PCT/US2006/028448, filed on Jul. 21, 2006, and entitled, "LOW-COST FLIGHT TRAINING AND SYNTHETIC VISUALIZATION SYSTEM AND METHOD." The entire disclosures of these three patent applications are hereby incorporated by reference in their entirety herein. The mobile data recording unit from these three patent applications may be mounted on a moving body 100 in any appropriate manner for purposes of the fleet operations quality management system of FIG. 1, including without limitation so as to be readily detachable relative to the moving body 100 (e.g., so as to be readily removable from the moving body 100), or in a manner to accommodate leaving the mobile data recording unit mounted to the moving body 100 at the end of each trip.

In the implementation of FIG. 1B, a separate remote memory subsystem 102 accepts data from the mobile data recording unit 101 in the form of messages using a standard communications protocol. The data received in these messages is stored in memory embedded within the remote memory subsystem 102. The remote memory subsystem 102 may also accept a "wake up" signal from the mobile data recording unit 101, which in one implementation allows the remote memory subsystem 102 to be dormant when information is not being recorded. However, the provision of power to the remote memory subsystem 102 need not be dictated by receipt of a signal from the mobile data recording unit 101—the provision of power to the remote memory subsystem 102 may be initiated on any appropriate basis. Moreover, the remote memory subsystem 102 may also be configured to exchange data with one or more external subsystems (i.e., sensor systems external to the mobile data recording unit 101) via a serial communications connection or any other appropriate communications link, and can also accept operator switch inputs.

Optionally, additional monitoring units 120 can be placed on the moving body 100 to collect data from external subsystems beyond what can be collected directly by the mobile data recording unit 101. These additional monitoring units 120 may be units similar in size and function to either the mobile data recording unit 101 or the remote memory subsystem 102, and each may be dedicated to an external subsystem on the moving body 100 and responsible for collecting data from that subsystem and sending it to the mobile data recording unit 101. Any number of additional monitoring units 120 can be tied into one or more subsystems of the moving body 100 to collect data, and send that collected data to the mobile data recording unit 101 via communication messages.

Additional optional components (that is, "additional data capturing subsystems") can be added to the data recording subsystem. An optional video capture system 130, comprising at least one video camera mounted in any appropriate location on the vehicle and the corresponding electronic control circuitry, can be added to the data recording subsystem. In one implementation, multiple cameras could be placed in the cockpit or cab of the vehicle or on external vehicle components such as control surfaces. The captured video data can be sent to the mobile data recording unit 101 for processing and storage in the remote memory subsystem 102. An optional voice recording system 135, comprising at least one audio capture device (e.g., microphone), can also be added to the data recording subsystem. Ambient audio information, such as conversations or noises from inside the cockpit or cab, can be sent to the data recording unit 101, as can voice information directly from the vehicle's radio and intercom system. The optional video capture system 130 and optional voice recording system 135 are two examples of subsystems which can be added to the data recording subsystem. It is obvious to one skilled in the arts that additional data capturing subsystems, beyond those described herein, can be added to interface with the data recording subsystem.

Figure 2:
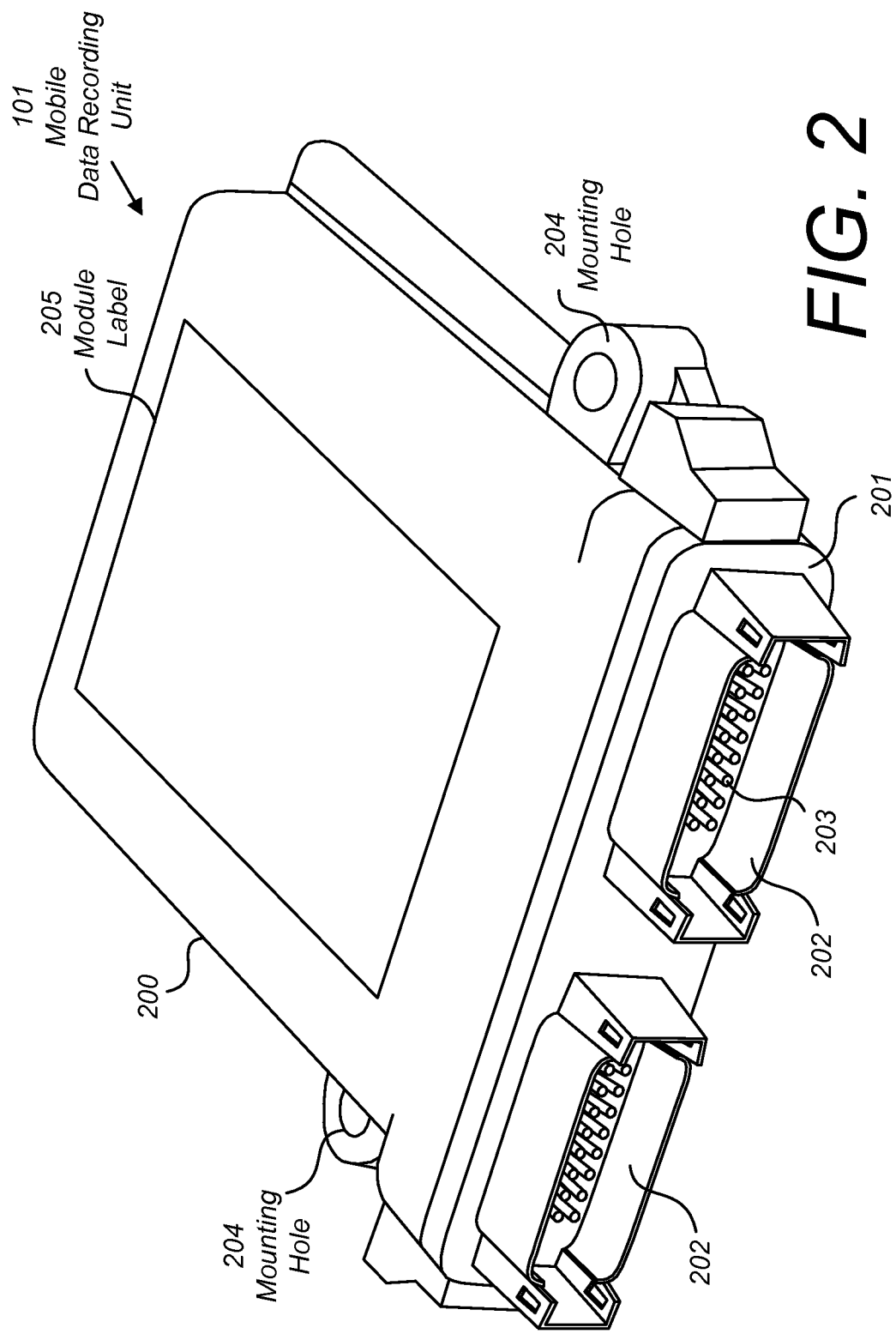
FIG. 2 is a perspective view of the self-contained remote or mobile data recording unit illustrated in FIG. 1A.

FIG. 2 is a perspective view of one implementation of a mobile data recording unit 101 that may be used in the fleet operations quality management system shown in FIG. 1. The mobile data recording unit 101 is housed in a main enclosure 200 and enclosure end cap 201, which together provide an environmental seal to protect the electronics for the mobile data recording unit 101. Any appropriate housing may be used for the mobile data recording unit 101. The enclosure end cap 201 includes one or more enclosure connectors 202 which contain one or more electrically-conductive pins 203. The electrically-conductive pins 203 allow electrical signals to pass between the electronics circuit board(s) inside the main enclosure 200 and enclosure end cap 201 and a device external to the mobile data recording unit 101. These electrical signals may include power for the electronics, readings from sensors located on the moving body 100, and data signals to and from other external devices. The mobile data recording unit 101 may be mounted to the moving body 100 using the mounting holes 204 integrated into the main enclosure 200. An optional module label 205 is placed on the outside of the main enclosure 200 and contains information about the mobile data recording unit 101.

Figure 3:
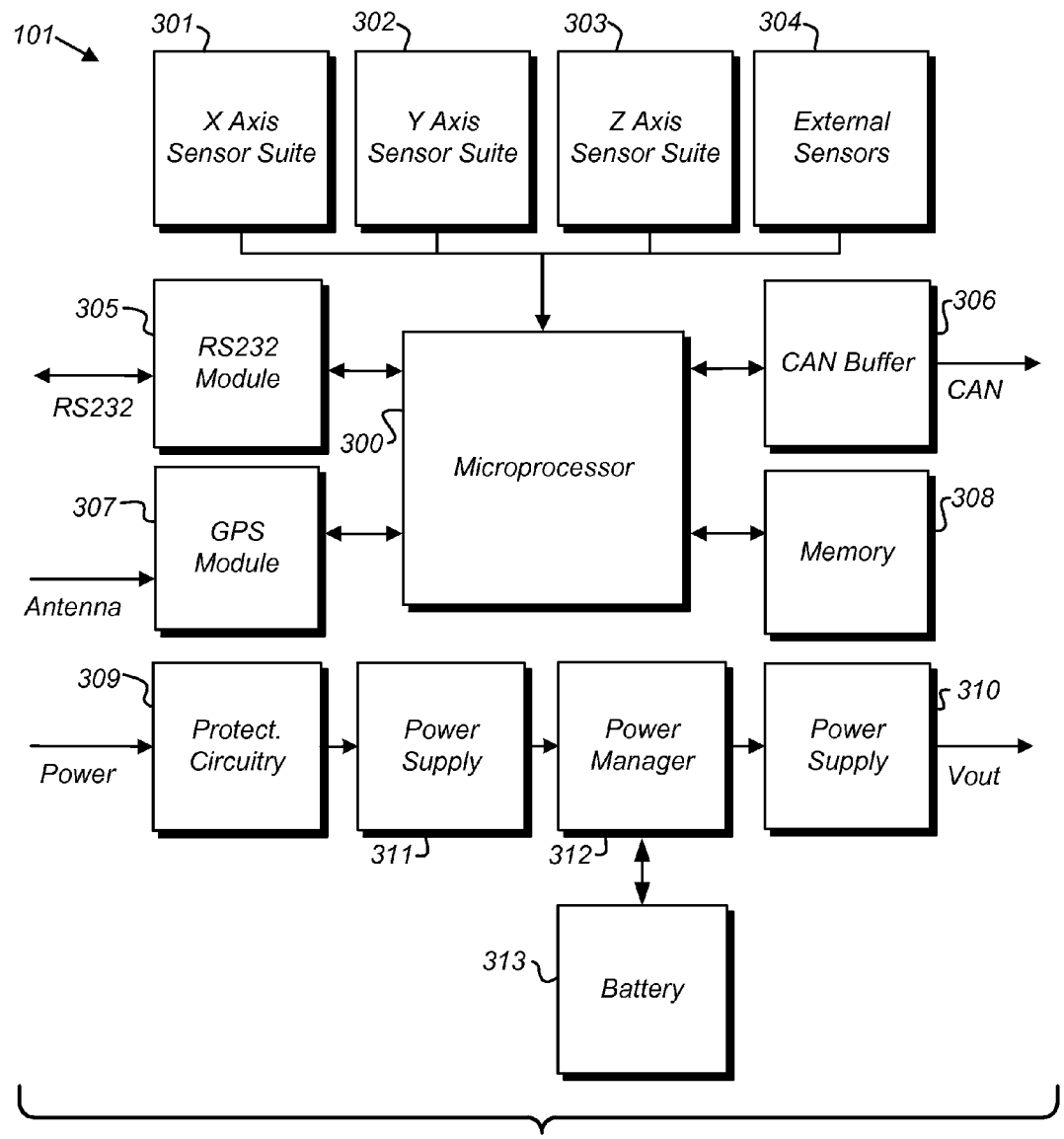
FIG. 3 is a block diagram showing one implementation of the electronic architecture of the self-contained mobile data recording unit of FIG. 2.

Inside the main enclosure 200 of one implementation of the mobile data recording unit 101 are the electronic components shown in FIG. 3. The mobile data recording unit 101 consists of several functional blocks. A low-end microprocessor 300 controls all functions within the mobile data recording unit 101 and collects data from the other functional blocks. A number of characterizations may be made about this low-end microprocessor 300, including without limitation, and which apply individually or in any appropriate combination: 1) the low-end microprocessor 300 may be significantly less powerful than any high-end microprocessor associated with the data collection kiosk 104 (e.g., the low-end microprocessor 300 may have no more than about 1% of the processing power of the associated data collection kiosk 104 in one implementation, the low-end microprocessor 300 may have no more than about 0.5% of the processing power of the associated data collection kiosk 104 in another implementation, and no more than about 0.1% of the processing power of the associated data collection kiosk 104 in yet another implementation); 2) the low-end microprocessor 300 may be in the form of no more than an 8-bit microprocessor; 3) the low-end microprocessor 300 may be configured to handle no more than about 20 million operations per second (20 MIPS); 4) the low-end microprocessor 300 may be configured to only acquire raw data; and/or 5) the functionality of the low-end microprocessor 300 may be limited to acquiring raw data from the various sensors of or in communication with the mobile data recording unit 101, and storing this raw data at one or more locations.

The X-axis sensor suite 301, the Y-axis sensor suite 302, and the Z-axis sensor suite 303 of the mobile data recording unit 101 each contain identical sensing components but are mounted orthogonally to each other, one in each of the three spatial dimensions. The sensor suites 301, 302, and 303 each contain magnetic sensing elements for sensing the Earth's magnetic field, accelerometers for sensing the magnitude of movement, and gyroscopes for sensing the rate of rotation of the mobile data recording unit 101 and therefore the moving body 100 to which the mobile data recording unit 101 is attached. Each sensor suite 301, 302, and 303 also contains an analog-to-digital converter to convert the raw analog sensor values to digital signals which can be read by the low-end microprocessor 300.

Contained on one or more of the sensor suites 301, 302, and 303 are pressure sensors which sense the ambient barometric pressure. These sensors require vents in the enclosure 200 to allow outside atmosphere into the mobile data recording unit 101. Brass vent ports or the like may be connected to the pressure sensors by small flexible tubes that are clamped on each end so that if the mobile data recording unit 101 goes into the water, water will not be allowed to enter the enclosure 200.

In addition to receiving signals from the integrated sensor suites 301, 302, and 303, the low-end microprocessor 300 can be configured to receive and process signals from external sensors 304, including but not limited to an outside air temperature (OAT) sensor, a rotor torque sensor as used on helicopters, and one or more operator switches.

The low-end microprocessor 300 can also process messages from additional monitoring units 120 received in the CAN buffer 306. In one implementation, the mobile data recording unit 101 has an RS232 module 305 or a similar communications module for serial communications with external subsystems. The mobile data recording unit 101 receives location information, including latitude, longitude, and altitude, from the GPS module 307 of the mobile data recording unit 101.

In addition to storing captured data in its own internal memory 308, the mobile data recording unit 101 sends a redundant copy of the data to the remote memory subsystem 102 for storage and later extraction. This may be done via communications messages sent to the remote memory subsystem 102.

The mobile data recording unit 101 receives power from an appropriate power source (e.g., from the power system of the moving body 100 or via an internal battery). This power is filtered through protection circuitry 309 which conditions the voltage for use. This protection circuitry 309 prevents damage caused by voltage spikes or other transient voltage conditions on the supplied power. A power supply 311 converts the voltage to the appropriate level for use in the mobile data recording unit 101. The power is controlled by a power manager circuit 312, which controls the input voltage from the power supply 311 and from the internal battery 313. A second power supply 310 may provide power to external devices such as the remote memory subsystem 102.

Figure 4:
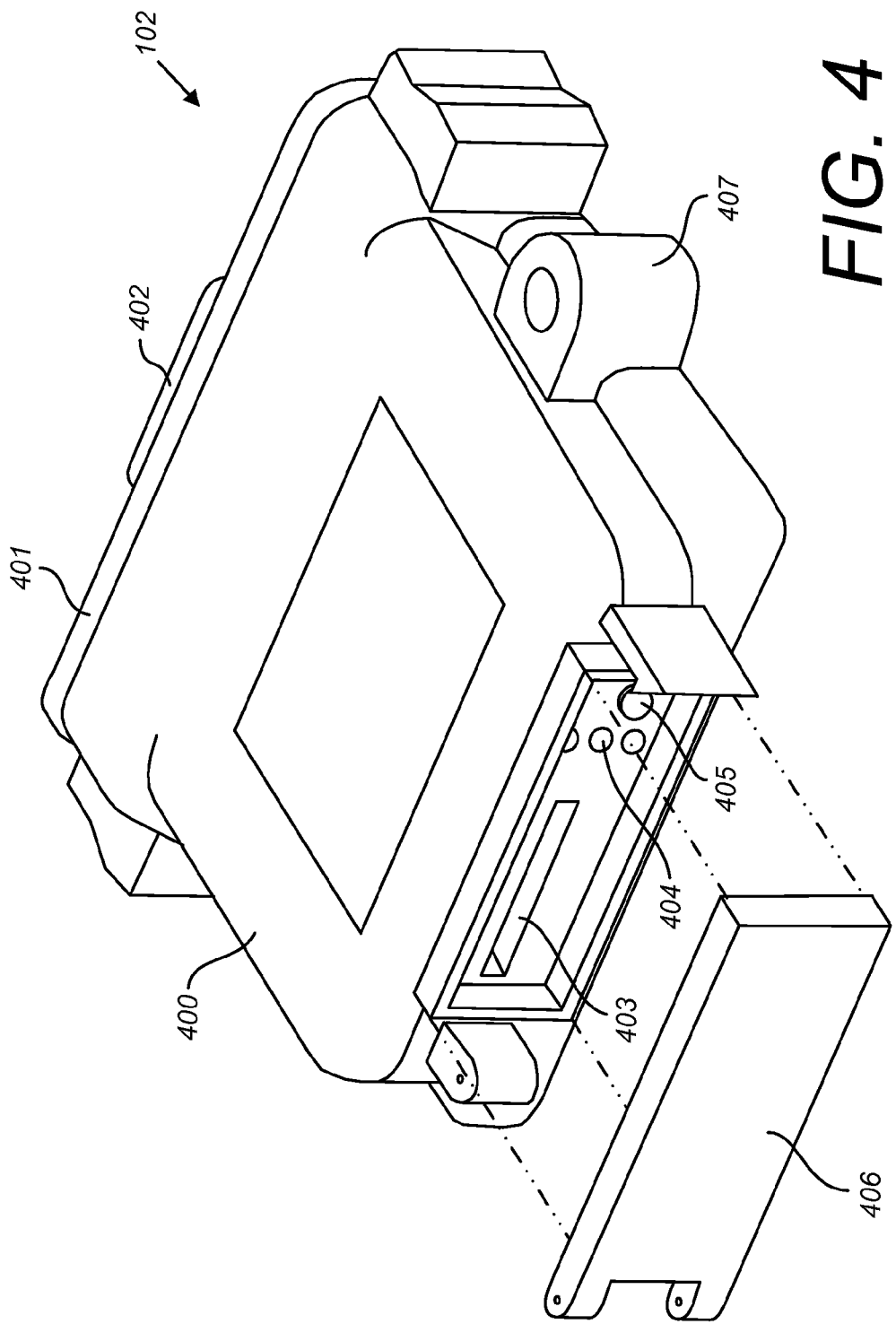
FIG. 4 is a perspective view of the remote memory subsystem illustrated in FIG. 1A.

FIG. 4 is a perspective view of one implementation of a remote memory subsystem 102 used in the fleet operations quality management system shown in FIG. 1. The remote memory subsystem 102 is housed in a main enclosure 400 and enclosure end cap 401, which together provide an environmental seal to protect the electronics for the remote memory subsystem 102. Any appropriate housing may be used for the remote memory subsystem 102. The enclosure end cap 401 includes one or more enclosure connectors 402, which allow electrical connections to be made between the internal components of the remote memory subsystem 102 and external components. One such external component, the mobile data recording unit 101, sends the data it collects to the remote memory subsystem 102 for storage and later transfer via the portable memory device 103a or any other appropriate communications link. The portable memory device 103a may be of any appropriate type (e.g., a floppy disk, a zip disk, a memory stick, a CD).

In the illustrated implementation, the portable memory device 103a is inserted into the memory device slot 403 of the remote memory subsystem 102. The memory device slot 403 contains electrical connection points which make contact with similar points on the portable memory device 103a so that data can be stored on the portable memory device 103a. One or more light emitting diodes (LEDs) 404 provide visual feedback to a user regarding the status of the remote memory subsystem 102. One or more operator buttons 405 are provided as a means of user input to control the operations (e.g., to initiate data extraction) of the remote memory subsystem 102. The memory device slot 403, LEDs 404, and operator buttons 405 are covered by an access panel cover 406 during operation to protect them from the elements. Mounting holes 407 are provided to allow the remote memory subsystem 102 to be mounted to the mobile data recording unit 101 or directly on a structural member of the moving body 100.

Figure 5:
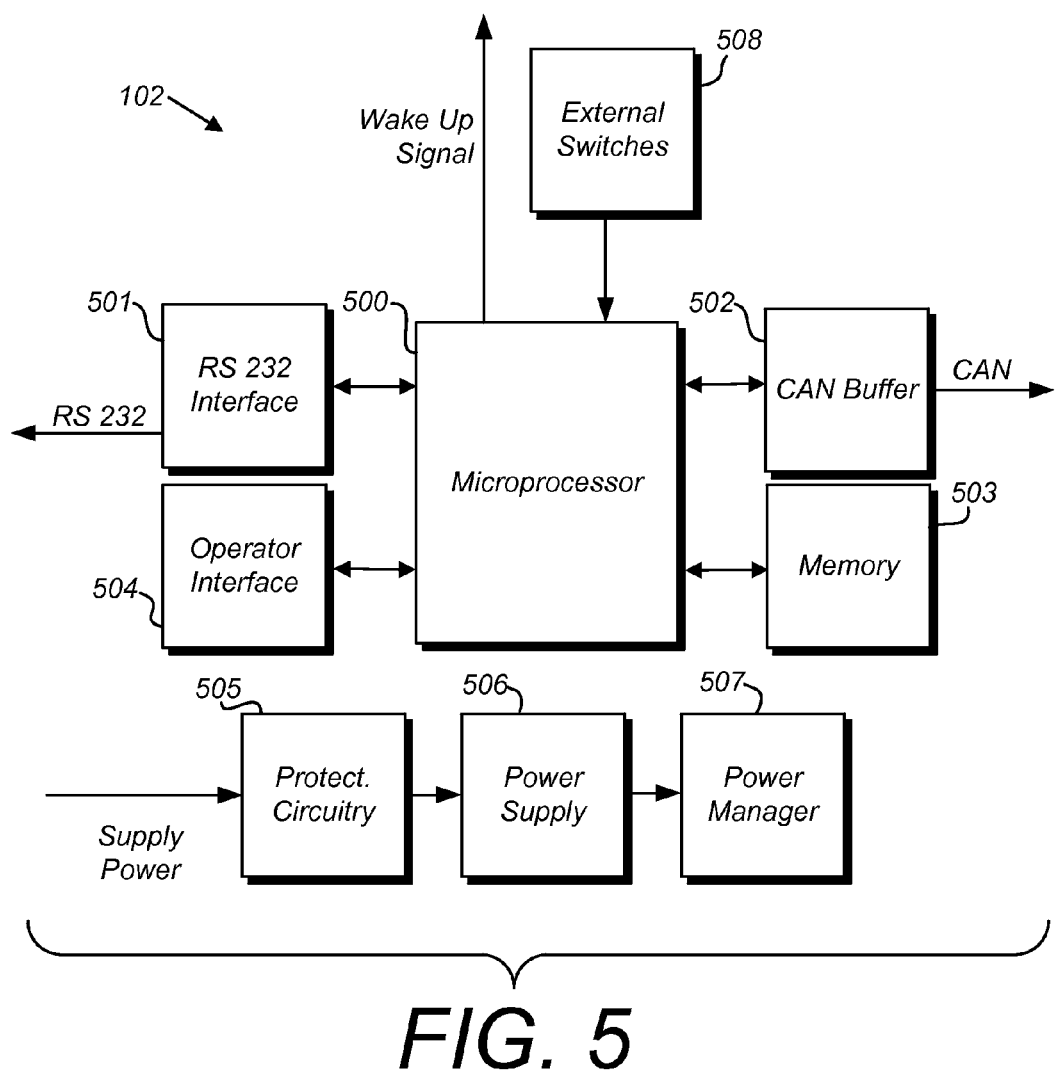
FIG. 5 is a block diagram showing one implementation of the electronic architecture of the remote memory subsystem of FIG. 4.

Inside the main enclosure 400 of the remote memory subsystem 102 are the electronic components shown in FIG. 5. The low-end microprocessor 500 of the remote memory subsystem 102 (which also may be in accordance with the low-end microprocessor 300; i.e., the discussion presented above with regard to the low-end microprocessor 300 may be equally applicable to the low-end microprocessor 500) controls the operation of the remote memory subsystem 102. An RS232 module 501 allows the remote memory subsystem 102 to communicate with external components using a standard serial communications protocol. Similarly, the low-end microprocessor 500 can communicate with external components using an industry standard communications protocol (such as Controller Area Network, or CAN), which is built into the low-end microprocessor 500. Messages sent to or received from external components are stored for processing in the message buffer 502. One such external component is the mobile data recording unit 101, which sends the data it captures regarding the associated moving body 100 to the remote memory subsystem 102 for storage.

A memory device reader 503 reads from and writes to the portable memory device 103a when it is present in the memory device slot 403. The operator interface circuit 504 controls the light emitting diodes 404. External switches 508 are also read and processed by the remote memory subsystem 102. The remote memory subsystem 102 receives power from an appropriate source (e.g., external power from the moving body 100, from an internal battery, or from the second power supply 310 of the mobile data recording unit 101). This power is filtered through protection circuitry 505 which conditions the voltage for use. This protection circuitry 505 prevents damage caused by voltage spikes or other transient voltage conditions on the supplied power. A power supply 506 converts the voltage to the appropriate level for use in the remote memory subsystem 102. The power is controlled by a power manager circuit 507, which controls the input voltage from the power supply 506.

The remote memory subsystem 102 is separate from the mobile data recording unit 101. This two-piece design allows the remote memory subsystem 102 or components thereof to be easily replaced without having to replace the mobile data recording unit 101. Since the remote memory subsystem 102 has parts that must be accessed frequently by a user or operator, such as the access panel cover 406 and the memory device slot 403, these parts are not sealed all of the time and can be exposed to elements such as salt air and humidity. Because of this, they may be susceptible to degradation and may need to be replaced more often than the mobile data recording unit 101. Designing these components into a smaller, less expensive enclosure limits the number of components that need to be replaced.

An alternate implementation of the fleet operations quality management system of FIG. 1 could combine the mobile data recording unit 101 and the remote memory subsystem 102 into a single housing (e.g., in the manner disclosed in the above-noted three patent applications that have been incorporated by reference herein). This would eliminate an enclosure and some redundant parts such as connector shells, and would therefore result in a lower system cost. A single unit design such as this could be used in environments where exposure to the elements is not an issue.

Another alternate implementation of the fleet operations quality management system of FIG. 1 could eliminate the mobile data recording unit 101 completely and use only the remote memory subsystem 102 by itself as a data logging unit to store information provided by subsystems already part of the moving body 100. In this alternate implementation, the fleet operations quality management system would not itself provide any sensors, but would merely log data that is already created by one or more components associated with the moving body 100.

Figure 6:
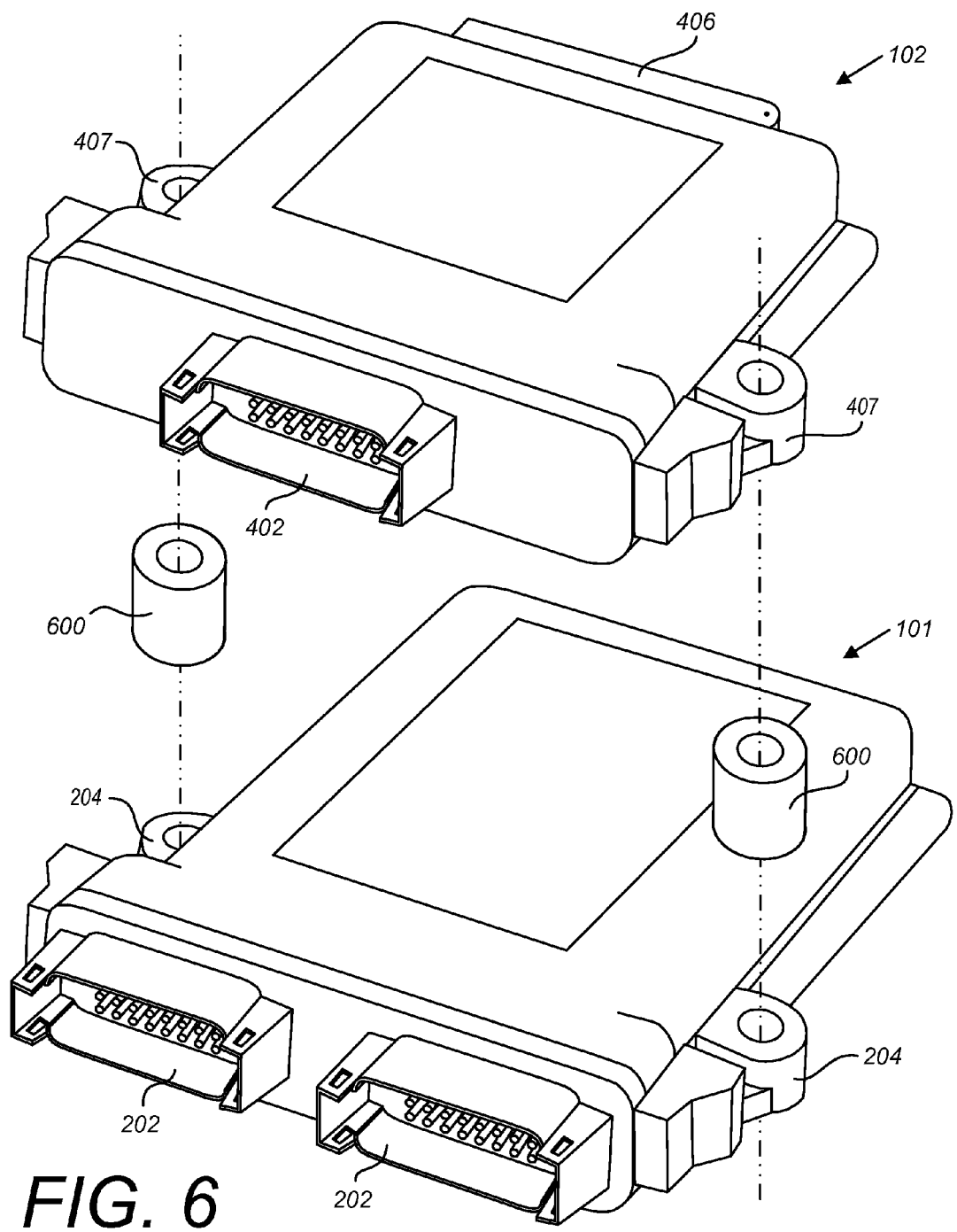
FIG. 6 is a perspective view showing how the remote memory subsystem of FIG. 4 could be co-located with the self-contained mobile data recording unit of FIG. 2.

Although the preferred implementation of the fleet operations quality management system separates the remote memory subsystem 102 from the mobile data recording unit 101, the two units can still be co-located when mounted to a moving body 100. FIG. 6 shows how the two devices can be mounted together, although any appropriate technique may be utilized. The remote memory subsystem 102 is placed on top of the mobile data recording unit 101, although any appropriate mounting location may be utilized. Circular stand-offs 600 are placed between the two units to allow air to flow between them to address build-up issues. Mounting holes 407, stand-offs 600, and mounting holes 204 are aligned, and bolts or similar mounting hardware are passed through the assembly and attached to a structural member of the moving body 100. Connector 402 from the remote memory subsystem 102 is placed on the same side as connectors 202 from the mobile data recording unit 101 to allow for an efficient electrical connection between the two devices. Access panel cover 406 is placed on the side opposite connectors 402 and 202 so that harnesses attached to these connectors will not interfere with the access panel cover 406. Optionally, remote memory subsystem 102 can be mounted in a location different from that of the mobile data recording unit 101 in relation to the moving body 100. The remote memory subsystem 102 could also be directly mounted to the moving body 100, with the mobile data recording unit 100 being mounted to the remote memory subsystem 102 as well.

In one implementation, a portable memory device such as a SD or MMC memory card is used as the portable memory device 103a and placed in the memory device slot 403 during normal operation. In any case, data captured by the mobile data recording unit 101 is sent to the remote memory subsystem 102, which in turn stores this data on the portable memory device 103a. When the portable memory device 103a is full, or when one or more trips are complete, the portable memory device 103a is removed from the remote memory subsystem 102 (e.g., by a user or by a maintenance worker (e.g., at the fleet terminal or the like)). In this manner, the user or maintenance worker (or more generally a designated individual(s)) may be responsible for a fleet of moving bodies 100, such as a number of aircraft at a flight operations base or a number of trucks at a trucking fleet terminal. The user or maintenance worker could collect the portable memory devices 103*a* from each moving body 100 for which they are responsible, and take them to a data collection kiosk 104 for processing, or use an alternate data transfer means for transferring the data from each relevant mobile data recording unit 101 to the data collection kiosk 104. Stated another way, the entirety of each trip file recorded by a data recording unit 101 is transferred to a data collection kiosk 104 only after the entirety of the trip file has been defined. Stated yet another way, the fleet operations quality management system of FIG. 1 does not involve the real-time transfer of data relating to a moving body 100 to any data collection kiosk 104.

Figure 7:
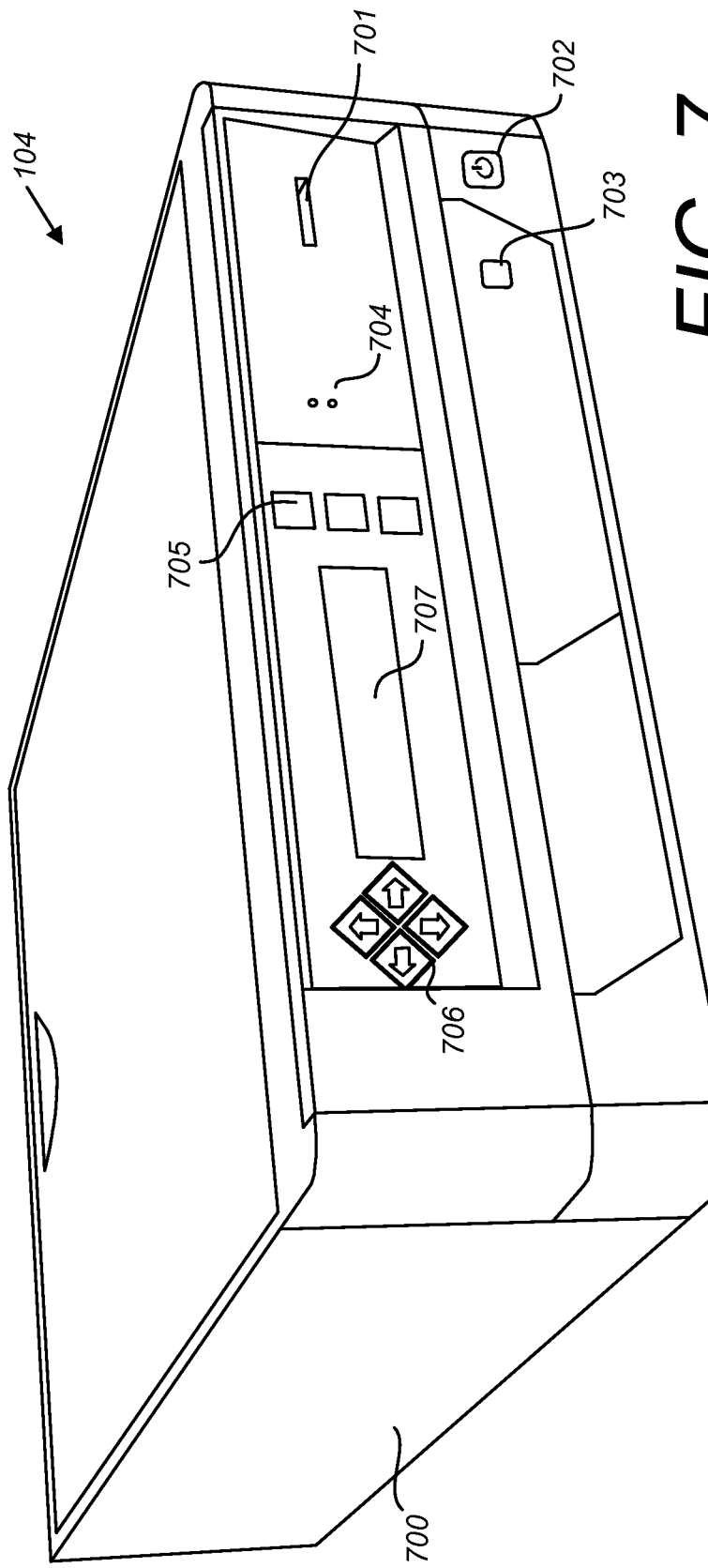
FIG. 7 is a perspective view of the off-vehicle or remote data processing device or data collection kiosk illustrated in FIG. 1A.

FIG. 7 illustrates the features of one implementation of a data collection kiosk 104. The data collection kiosk 104 is a dedicated computer for receiving and processing the data relating to the moving body 100 after the entire trip file has been defined. The data collection kiosk 104 may be placed at a central location at a fleet terminal or the like, such as a user or maintenance worker's office, or at any other appropriate location. The user transfers the data from the remote memory subsystem 102 associated with a particular moving body 100 to the data collection kiosk 104 in any appropriate manner. In one implementation, a portable memory device 103*a* again is used for this data transfer, and the portable memory device 103*a* is placed in the kiosk memory device slot 701 of the data collection kiosk 104. Light emitting diodes (LEDs) 704 provide status indications to the user, such as when the data collection kiosk 104 is powered on and when the data is being processed. In one implementation, the user initiates the data extraction process by pressing a data extraction button 703, although the data extraction process could be initiated in any appropriate manner. In another implementation, the data extraction process is automatically initiated when the portable memory device 103*a* is placed in the kiosk memory device slot 701. A display panel 707 provides feedback on the extraction process to the user in the form of text and menu options. The user can interact with the menu on the display panel 707 through the use of the function keys 705 and the direction keys 706. Data is transferred and cached in the internal memory of the data collection kiosk 104. The data collection kiosk 104 then processes the cached raw sensor data using algorithms stored on the data collection kiosk 104. These algorithms may combine raw sensor readings taken from multiple sensors and combine and filter them to derive new data values which are more accurate than the values from any single sensor. This process is called "sensor fusion". The data collection kiosk 104 can be turned on and off using the power key 702. A kiosk housing 700 encloses and protects the electronics of the data collection kiosk 104. Any appropriate housing may be used for the data collection kiosk 104.

After each trip file from the portable memory device 103*a* has been processed by the data collection kiosk 104, the portable memory device 103*a* may be erased and formatted for use with a mobile data recording unit 101, and then removed from the kiosk memory device slot 701. Data from multiple moving bodies 100 can be processed in this manner.

In one implementation, a portable memory device (e.g., a memory card or the portable memory device 103*a*) can be used to send information from the data collection kiosk 104 back to the remote memory subsystem 102. This information is copied onto the portable memory device by the data collection kiosk 104, and the portable memory device is then inserted back into the remote memory subsystem 102. This information can include requests to initiate built-in self-tests, commands for additional data, or new operating software for the remote memory subsystem 102. Once the portable memory device containing the information or commands is placed into the memory device slot 403 on the remote memory subsystem 102, the commands may be initiated by the user pressing one of the operator buttons 405 on the front of the remote memory subsystem 102 or in any other appropriate manner.

When a trip file recorded from moving body 100 has been extracted and processed, the trip file may be queued for later transmission to the main server 105 over an Internet connection 108 or in any other appropriate manner. Typically, the trip file would be scheduled for transfer over the Internet connection 108 during off-peak hours, such as overnight, to avoid taking system bandwidth away from day to day operations. However, trip files may be sent at any appropriate time.

The main server 105 receives and analyzes the trip file. The main server 105 compares the data in each trip file against established trip profiles to see if any of the trip files contain "deviations". A deviation is an event when the moving body 100 performed outside of the ranges established as acceptable or safe in the pre-defined trip profiles (e.g., where a moving body 100 broke a rule associated with the trip profile). For example, if an aircraft is supposed to maintain a minimum altitude above a populated city, a deviation occurs when the aircraft drops below that minimum altitude when above a city. Trip files that do not contain deviations are sent for archival and further processing in a central database 106. Trips with one or more deviations may be sent for display to an operator on a web application 107.

Figure 8:
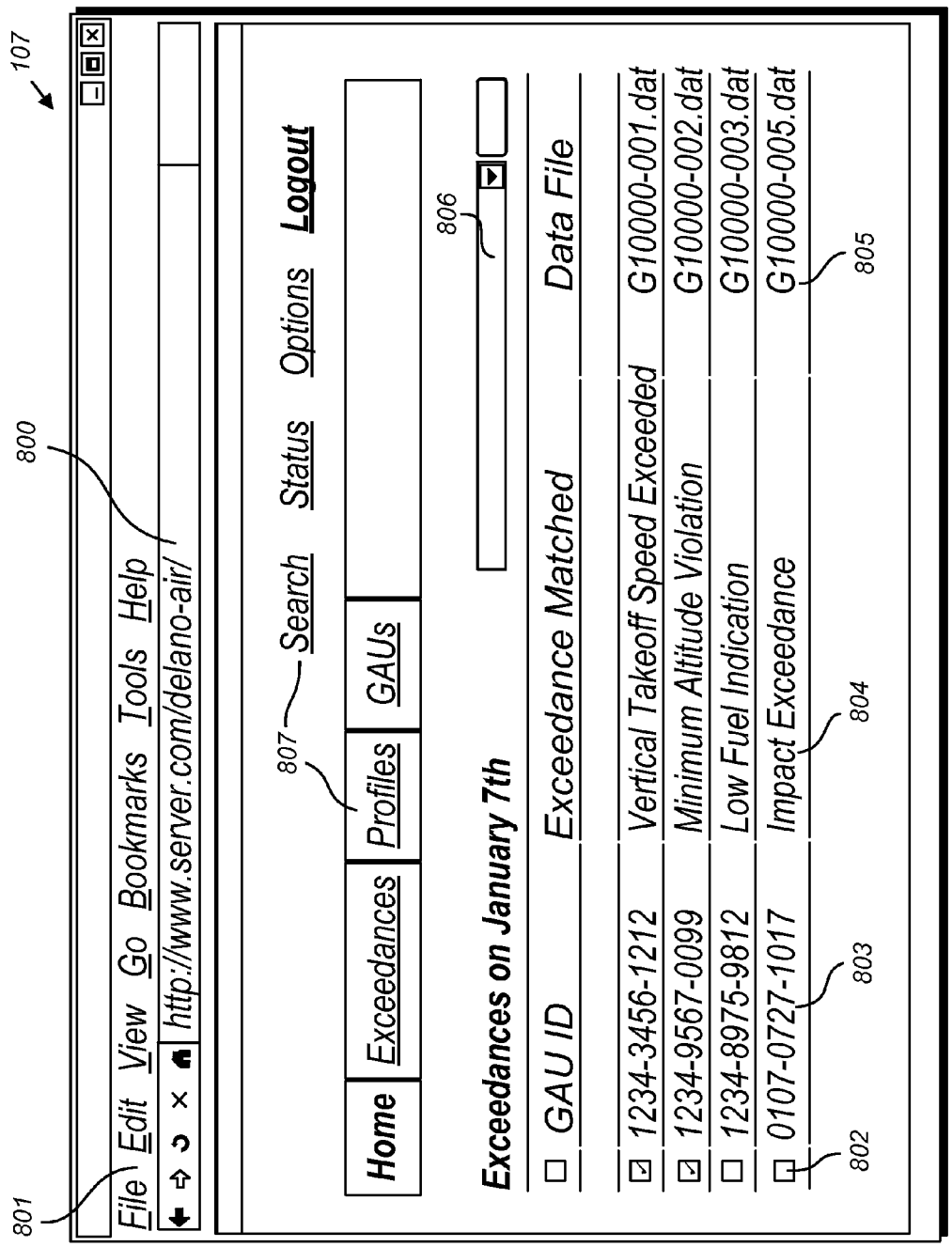
FIG. 8 illustrates a representative display on the user interface illustrated in FIG. 1A.

FIG. 8 shows one example of a typical use of a web application using a remote access station 107. The web application may be accessed over a typical Internet connection 108. The trip files from the main server 105 may be located by typing the server address in the address entry blank 800 using the web application and remote access station 107, or they may be retrieved in any other appropriate manner (e.g., through one or more input or login screens). Typical screen controls 801 can be used to navigate through and interact with the web application via the remote access station 107. A list of deviations for the associated fleet may be displayed on the home page of the web application via the remote access station 107 for operator review. What deviations appear on the list may be established in any appropriate manner. For instance, the deviations that are initially displayed may be associated with trip files that were stored on the central database 106 at some point in time after the operator last logged onto the main server 105. Another option would be for the user to input a date or a range of dates, and the list of deviations may be for trip files that were initially generated on the designated date or within the designated date range. Deviations could be listed for an entire fleet of moving bodies 100, for any individual moving body 100 within a relevant fleet, or for any combination of moving bodies 100 within a relevant fleet. In any case, each deviation that is displayed preferably provides information to the user as to at least the general nature of the deviation.

Check boxes 802 are provided on the screen to allow the user/operator to select one or more deviations on which to perform operations such as deletion or archival. An identification number 803 is provided for each deviation showing which mobile data recording unit 101 was used to record the particular deviation. The type or title of the deviation 804 is displayed next to the identification number 803, and the name of the data file 805 created by the data collection kiosk 104 is also displayed. The operator may select specific actions to be applied to the selected deviation using the command picklist 806. Other pages of the web application can be accessed using hyperlinks 807 provided on the main page using the remote access station 107.

Figure 9:
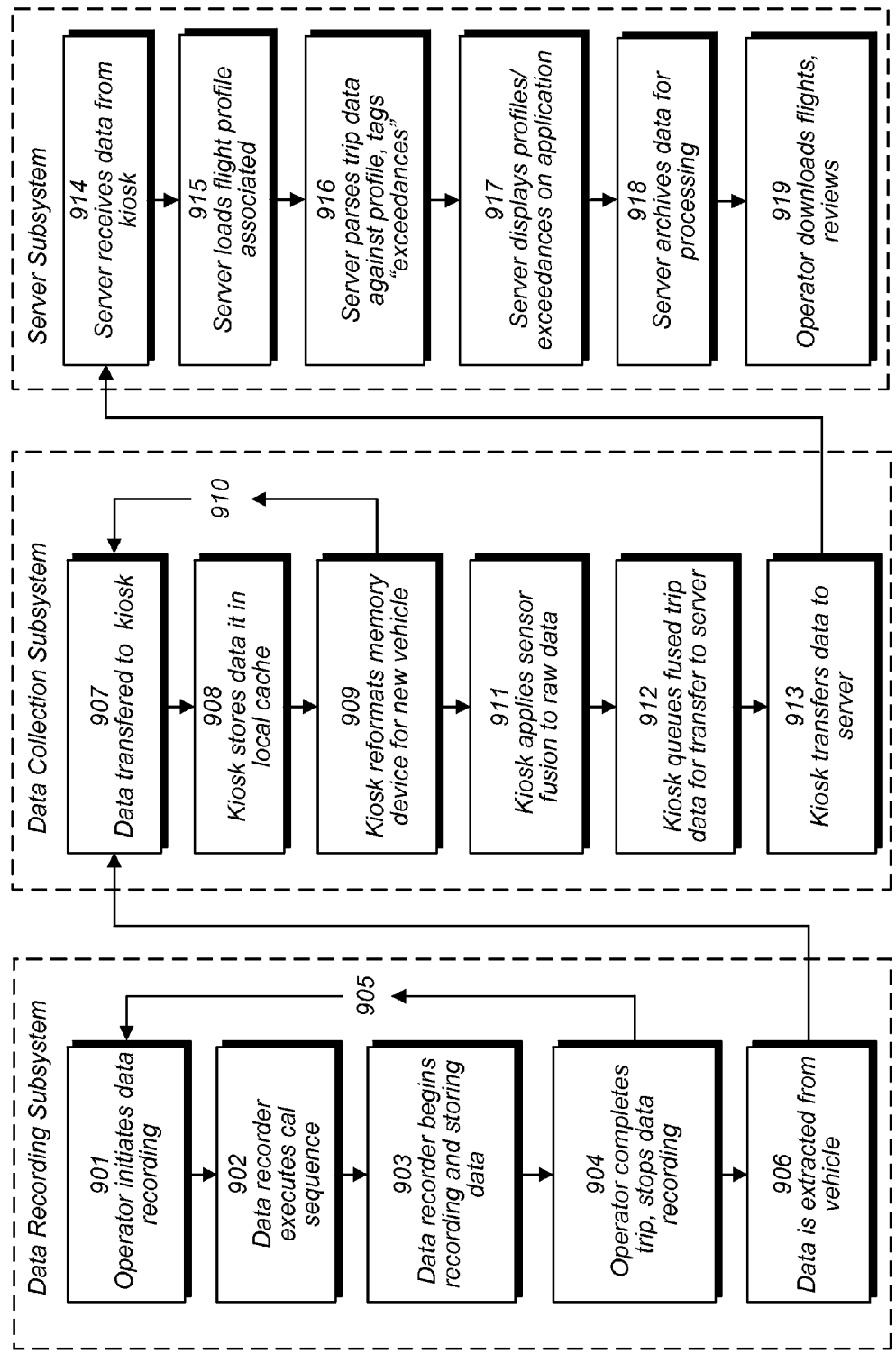
FIG. 9 is a flowchart of one implementation for operating the fleet operations quality management system of FIG. 1.

FIG. 9 is a flowchart showing one implementation of the use of the fleet operations quality management system of FIG. 1. The flowchart follows the data collected by a single instance of the mobile data recording unit 101 as it moves through the system. It is important to note that multiple mobile data recording units 101 would be deployed and in operation in an actual implementation of this system.

An operator or other person associated with the moving body 100 may manually begin the data recording process (Step 901), or data recordation may be initiated in any appropriate manner (e.g., automatically in the case of an unmanned vehicle), and which may cause the mobile data recording unit 101 to execute a calibration sequence (Step 902). In one implementation, the data recording process is automatically initiated when the trip begins, and is automatically discontinued when the trip ends. The purpose of the calibration sequence is to adjust the sensors packaged inside of the mobile data recording unit 101 for operation on the moving body 100. Once the calibration sequence has been performed on a mobile data recording unit 101, the calibration sequence may no longer be necessary in at least certain instances (e.g., if the mobile data recording unit 101 is not thereafter removed from the moving body 100). Once any calibration sequence is complete, the mobile data recording unit 101 begins capturing data from the sensors, storing it internally, and sending it to the remote memory subsystem 102 for storage (Step 903). Data recording may be discontinued in any appropriate manner and at any appropriate time, for instance manually or automatically at the end of a trip (Step 904). The mobile data recording unit 101 may be configured to automatically stop recording when the trip is complete and the moving body 100 is no longer moving. The mobile data recording unit 101 again may not depend on vehicle battery power to continue working, and may continue recording for an indefinite period of time after vehicle battery power is turned off. The mobile data recording unit 101 may use an algorithm to determine when recording should be turned off. An example algorithm may be to turn off 5 minutes after vehicle battery power is switched off and one minute after motion of the vehicle has ceased. This trip cycle completes as necessary, and multiple trips may be stored in the remote memory subsystem 102 (Step 905). Periodically, or when the memory is full, the data is transferred from the remote memory subsystem 102 to the data collection kiosk 104 in any appropriate manner (e.g., via a portable memory device 103a) (Step 906).

The data may be transferred to the data collection kiosk 104, alone or along with data collected from other moving bodies 100 in the associated fleet. For instance, an operations or maintenance worker may manually transfer the data to the data collection kiosk 104 (Step 907) via one or more portable memory devices 103a. The data collection kiosk 104 stores the data in internal memory (Step 908). If a portable memory device 103a is used, the data collection kiosk 104 may reformat the portable memory device 103a for subsequent use on another moving body 100 (Step 909). Multiple data sets or trip files can be processed in this manner (Step 910). When the data/trip file is extracted, the data collection kiosk 104 may apply sensor fusion algorithms to the data/trip files to pre-process the raw data collected by the mobile data recording unit 101 (Step 911). In one implementation, the data collection kiosk 104 may also check the data/trip file to see if there are any gaps in the data, to detect for potential tampering regarding any of the raw sensor trip data/trip files, to assess the validity of the raw sensor trip data/trip files, or the like. If one or more conditions of this general nature are detected, the data collection kiosk 104 may inform the user/operator that there is a desire/need to extract the redundant copy of the data that is stored in the mobile data recording unit 101. In another implementation, this data validity check may be done by the main server 105 after the trip files have been transferred from the data collection kiosk 104.

Each data collection kiosk 104 may be configured to detect for potential tampering in any appropriate manner. Once again, raw sensor trip data on multiple trips may be stored on a given portable memory device 103a or may be otherwise transferred from the remote memory subsystem 102 to a data collection kiosk 104. That is, raw sensor trip data on a certain number of trips from a given remote memory subsystem 102 may be transmitted to a data collection kiosk 104 for analysis. These multiple sets of raw sensor trip data may have an associated identifier, and these identifiers may be sequentially numbered. If a determination is made by the data collection kiosk 104 that a collection of raw sensor trip data from a given remote memory subsystem 102 is missing an identifier that should be in the sequence (e.g., the data collection kiosk 104 may be provided with sets of raw sensor trip data that are numbered 20-25 and 27-30—i.e., number 26 is missing), an indication of this condition may be conveyed and the raw sensor trip data of at least the missing trip(s) may then be retrieved from the relevant mobile data recording unit 101 for analysis (e.g., raw sensor trip data from the missing trip(s) may be retrieved from the relevant mobile data recording unit 101, or raw sensor trip data from each trip may be retrieved from the relevant mobile data recording unit 101). Other ways to identify raw sensor trip data that has been subject to potential tampering after being retrieved from the remote memory subsystem 102 may be utilized. Moreover, one or more ways for assessing whether the raw sensor trip data on each trip is otherwise "valid" (e.g., not corrupt) may be utilized as well.

As the raw sensor data on each trip has been processed by the data collection kiosk 104, the data collection kiosk 104 may queue this data/trip file for later transfer to the main server 105 (Step 912) and then transfer the data/trip file to the main server 105 at a pre-determined time during off-peak usage hours (Step 913). However, each trip file may be transferred from the data collection kiosk 104 to the main server 105 in any appropriate manner and at any appropriate time. That is, what is of particular importance is that each data/trip file is sent from the data collection kiosk 104 to the main server 105.

The main server 105 receives the data over an Internet connection 108 (Step 914). The main server 105 examines the serial number of the mobile data recording unit 101 associated with each trip file, and loads the associated trip profile based on those serial numbers (Step 915). Any appropriate way may be utilized to associate a trip file with its relevant trip profile. The main server 105 compares each trip file to the trip profile to see if any of the trip files contain "deviations", trip parameters that fall outside of the acceptable ranges defined by the trip profiles (Step 916). Trip files that contain deviations are sent for display on the relevant remote access station(s) 107 (e.g., via a web application main page) (Step 917). All data/trip files, including those that do not contain deviations, are sent via a LAN connection 109 to the central database 106 for archival and further processing (Step 918). Using the remote access station 107 (e.g., via web application), the operator may download those trip files with marked deviations for further review (Step 919). Non-deviation files stored in the central database 106 can also be accessed through a request to the main server 105 and displayed on the remote access station(s) 107 (e.g., via a web application) as needed.

In addition to providing access to trip files, the remote access station 107 (e.g., via a web application) can send the trip files to a graphical application such as that noted in the above-noted U.S. patent application Ser. No. 11/327,965. This graphical application may be part of a web application, but in any case can recreate the travel path of the moving body 100 through three-dimensional space by displaying a realistic graphical model of the moving body 100 on a simulated recreation of the environment in which the moving body 100 made its trip. This graphical application can incorporate satellite or high-altitude images of the geographical location where the trip was made, as well as terrain information. This additional information is downloaded from the Internet connection 108. In addition to imagery and terrain information, the graphical application can download or create additional graphical images to further augment the playback of the trip. For instance, a visual representation of the vehicle's path through space, such as a ribbon or line representing the path, can be shown extending out behind and in front of the moving body. This line can use colors or other graphical means to indicate areas in the trip where an event or deviation occurred. The operator can move quickly to the point in the trip where the event occurred, and can select the event to display additional information. Also, other information pertaining to the time the trip was made, such as weather and sunlight conditions, can be downloaded and displayed on the graphical simulation or used to augment the information stored in the trip data files. An intelligent software agent can be employed to mine the server and Internet for the best available information to augment the raw sensor data captured by the mobile data recording unit 101.

An important aspect of the fleet operations quality management system is the processing performed by the data collection kiosk 104. At least some of this processing may be referred to as "sensor fusion", as its primary purpose is to combine the raw, unprocessed readings captured from multiple, redundant sensors into one highly-accurate data stream representing the trip completed by the moving body 100. For example, algorithms are used to derive values for the yaw, pitch, and roll of the moving body 100 based on three-dimensional position and movement data from GPS satellite readings. These derived values for yaw, pitch, and roll are then compared to and combined with readings for yaw, pitch, and roll read directly from the accelerometers, gyroscopes, and magnetic sensors integrated into the mobile data recording unit 101. By combining yaw, pitch, and roll values from these two different but redundant sources, a more accurate and stable trip path can be derived. The GPS-derived readings can help compensate for sensor drift which is inherent in the gyroscopes, and the direct sensor readings can help compensate for the inherent inaccuracies of the GPS-only solution.

There are several key improvements the fleet operations quality management system described herein offers over known prior art. First, the mobile data recording unit 101 is designed such that it can be operated as a self-contained device which does not have to be tied into a vehicle's subsystems. The mobile data recording unit 101 contains enough integrated sensors to allow it to capture navigational data on its own without requiring additional information from the vehicle or its existing subsystems. This allows the mobile data recording unit 101 to be portable and easily installed in many types of vehicle systems. Because the mobile data recording unit 101 is designed such that it is not required to interface to existing subsystems, it is significantly easier to certify for use on vehicles such as aircraft. It can also be designed to be significantly less expensive than existing systems seen in the prior art.

Although the mobile data recording unit 101 can be operated as a self-contained system in one implementation, it is also capable of receiving information from existing on-board systems in other implementations. The mobile data recording unit 101 can receive signals from these existing systems via connections built into the housing.

A second improvement over known prior art is that the fleet operations quality management system captures raw sensor data and allows this raw sensor data to be downloaded to an external system for later processing. At least certain known prior art systems require that the sensor data be processed on the vehicle, and provide only this processed data to external systems for review. In these known prior art systems, the raw sensor data is not saved and cannot be retrieved for further processing. In the fleet operations quality management system described herein, the raw data is captured and preserved and can be processed off-line using multiple algorithms and external systems as required. This approach also allows the mobile data recording unit 101 to use a simple and inexpensive low-end microprocessor just powerful enough to capture the raw data, and to use a more powerful off-board computer for later processing of the data.

Because the captured raw data is processed after the trip, and not during it, the fleet operations quality management system described herein offers a third improvement over known prior art systems. The data collection kiosk 104 is essentially a personal computer dedicated to processing the raw sensor data sometime after the trip has taken place. Because the trip is completed when this post-processing occurs, the data collection kiosk 104 can process the raw data by looking ahead in time, to see what the moving body 100 will be doing beyond the point in time that is currently being processed. This means that the processing algorithms do not have to depend only on historic data and trends, but can use this "fore-knowledge" of the trip to provide a more accurate analysis of the trip data points.

A fourth improvement of the fleet operations quality management system described herein over known prior art systems is the ability of the operator to use the web application to define their own trip profiles without having to ask the application supplier to implement the new profiles. The web application provides a simple menu-driven user interface to allow the operator to edit existing trip profiles or to add entirely new ones. This feature allows the system to be easily used with many different kinds of vehicles without significant rework or redesign.

Figure 10A:
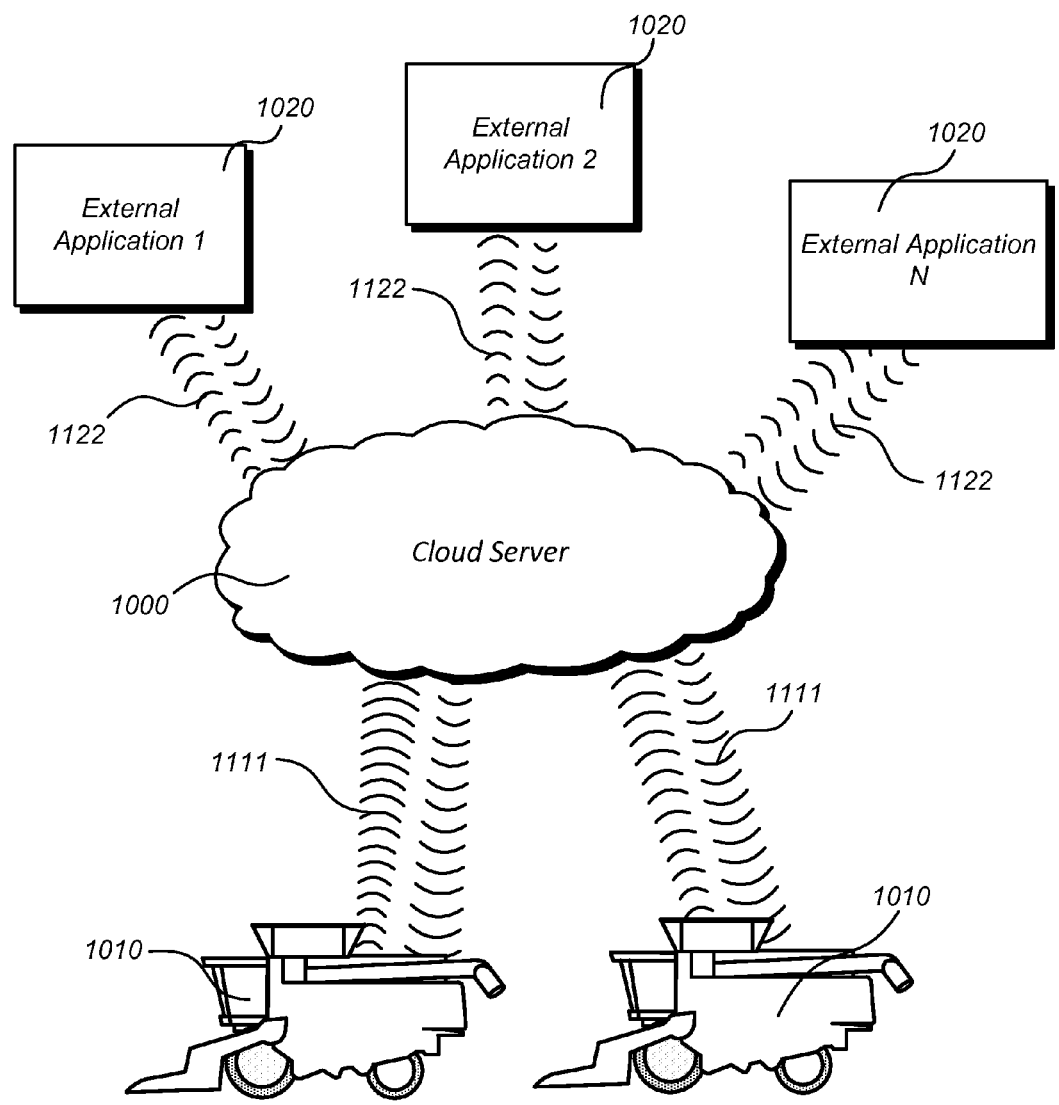
FIG. 10A is an illustration of an alternate embodiment of the fleet operations quality management system where the "fleet" is a fleet of land vehicles.

FIG. 10A is an illustration of an alternate embodiment of the fleet operations quality management system where the "fleet" is a fleet of land vehicles. The example shown in the remaining figures (FIGS. 10A-13) use agricultural vehicles, but the invention could be used for any type of land vehicles, including construction, on-highway, or any other type of vehicles, especially vehicles that are part of a fleet.

In the example shown in FIG. 10A, a fleet of land vehicles 1010 such as combine harvesters are in communication as they operate with a cloud server 1000 via a wireless communications link 1111. The communications link 1111 may be any appropriate type of wireless communications link used for the transfer of data, including but not limited to cellular communications and satellite communications.

The vehicles 1010 record data as they perform operations. This data is recorded by a system located on each vehicle and this on-board system will be further discussed in FIG. 10B. This data may include information generated by the existing electronic modules and sensors on the vehicle 1010 or may be generated by an electronic module added to the vehicle 1010 as described in FIG. 10B. This data may include, but not be limited to, vehicle speed, vehicle location, vehicle settings, vehicle status, status of implements attached to the vehicle, fluid levels, system temperatures, system errors and malfunctions, product bin levels (seed bins, grain tanks, chemical tanks, etc.), environmental conditions, sensor readings, crop conditions, soil conditions, moisture content, or any other appropriate data that might be generated or collected by a vehicle 1010.

The data is transmitted via communications link 1111 from each vehicle 1010 to the cloud server 1000. The cloud server 1000 will store the data and make it available for other external applications 1020, which can access the data stored in the cloud server 1000 via an appropriate server connection 1122.

Optionally, the cloud server 1000 may process the stored data, perhaps performing sensor fusion or data fusion, whereby different types of data are combined to produce new information. For example, consecutive geographic location reports paired with data timestamps can be used to calculate vehicle speed (time it takes to travel from one location to the next). This fused or processed data may also be made available to the external applications 1020.

Figure 10B:
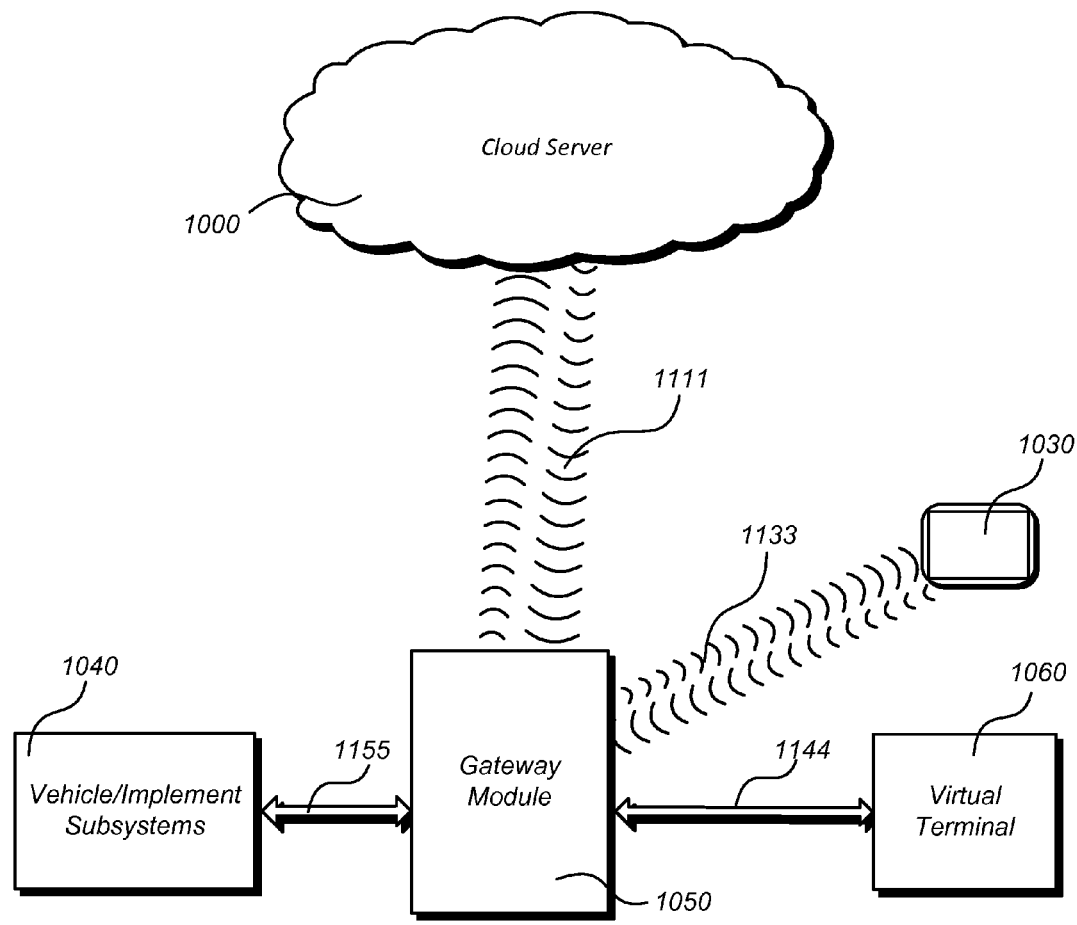
FIG. 10B is an illustration of electronic modules that may be present on the alternate embodiment of the fleet operations quality management system of FIG. 10A.

FIG. 10B is an illustration of electronic modules that may be present on the alternate embodiment of the fleet operations quality management system of FIG. 10A. FIG. 10B and FIG. 10A should be considered together for the following discussion.

A gateway module 1050 resides on the vehicle 1010 (from FIG. 10A), and is in communications with the subsystems 1040 present on either the vehicle 1010 or an implement attached to the vehicle 1010. The gateway module 1050 may be connected to the subsystems 1040 via a communications bus 1155 resident on the vehicle 1010. This communications bus 1155 may be any appropriate type of communications bus, including but not limited to a communications bus 1155 employing a standard communications protocol such as the industry standard CAN (Controller Area Network) protocol. Without limitation, the gateway module 1050 can be similar to the gateway module described in U.S. Patent Publication No. 2013/0211628, which is incorporated herein by reference.

The gateway module 1050 may optionally also be connected to a virtual terminal 1060 resident on the vehicle, and/or to a mobile device 1030. The mobile device 1030 may be any appropriate type of wireless, portable device with an appropriate display, such as a smart phone, a mobile computing device (such as an iPad), or a portable computer (such as a laptop). The gateway module 1050 may be connected to the virtual terminal 1060 via a direct wired connection 1144 such as a serial connection, or any other type of appropriate connection, including a wireless link. The mobile device 1030 may be communicating to the gateway module 1050 via a wireless communications link 1133, such as a Wi-Fi or Bluetooth connection, or any other appropriate type of wireless communications. The purposes of connecting the gateway module 1050 to either the virtual terminal 1060 or a mobile device 1030, as it pertains to this invention, is to show that the gateway module has access to and receives user input from the operator interface of the virtual terminal 1060 or the mobile device 1030. This user input can be then sent, along with other data from the vehicle subsystems 1040, to the cloud server 1000 via communications link 1111.

The gateway module 1050, as shown in this alternate embodiment of the fleet operations quality assurance system of the present invention, may perform the duties of the mobile data recording unit 101 of FIG. 1A and other figures in this specification, and may also incorporate the functionality of the remote memory subsystem 102. The functionality previously described for the mobile data recording unit 101 and remote memory subsystem 102 can be applied to the gateway module 1050 of FIG. 10B. In addition to providing these functions, the gateway module 1050 is connected to vehicle subsystems 1040, virtual terminals 1060, mobile devices 1030, and the cloud server 1000. The cloud server 1000 of FIGS. 10A and 10B represents an alternate embodiment of the main server 105 in FIG. 1A and other figures in this specification, and the communications link 1111 of FIGS. 10A and 10B represents an alternate embodiment of the internet connection 108 of these previous figures. Data can be transferred from the gateway module 1050 via a portable memory device 103a, as previously described. The point of this description is to illustrate that the ground fleet operations quality assurance embodiment of FIGS. 10A and 10B is a modification to the system described in FIG. 1A, and is capable of performing the exact same tasks as previously described.

Figure 11:
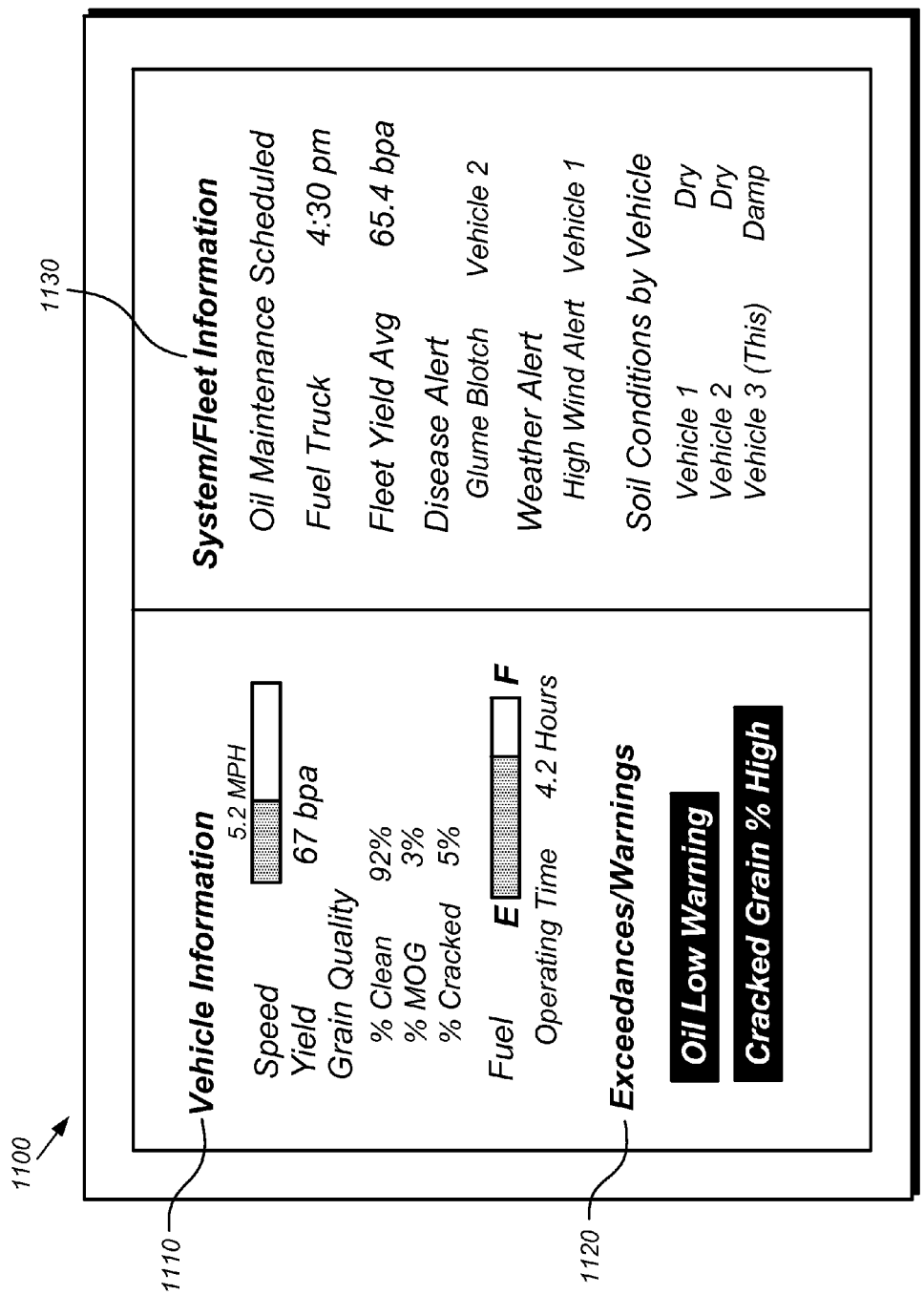
FIG. 11 is an example vehicle display that might be used in the alternate embodiment of the fleet operations quality management system of FIG. 10A.

FIG. 11 is an example vehicle display that might be used in the alternate embodiment of the fleet operations quality management system of FIG. 10A. The vehicle display 1100 may be implemented as a virtual terminal (1060 from FIG. 10B) or as a mobile device (1030 from FIG. 10B), or as any other appropriate type of display device.

The vehicle display 1100 can access information from the gateway module (1050 of FIG. 10B) and therefore can display information on the vehicle itself 1110, information on the entire fleet as a whole 1130, or exceedances and/or warnings 1120 that pertain to the vehicle 1010 or to a fleet of vehicles 1010. Several example types of information are shown in FIG. 11, but the types of data items shown are exemplary only and not meant to be limiting. Vehicle information 1110 is any information that is generated by the vehicle 1010 itself, such as speed, location, sensor values, fluid levels, etc. System/fleet information 1130 is any information that is generated from data collected from a fleet of vehicles or a subset of two or more vehicles from a fleet. This information may include but not be limited to data averages over the fleet or fleet subset, environmental information from other vehicles in the fleet that may be of interest to the present vehicle 1010, or information involving external applications such as a service provider who has scheduled a service or maintenance for the present vehicle. Exceedances/warnings 1120 are any type of information indicating a current status of the present vehicle 1010 which may require attention. This information may include, but not be limited to, maintenance warnings, sensor values that are outside of the norms previously established for the operational profile for the vehicle 1010, environmental concerns, etc.

Figure 12:
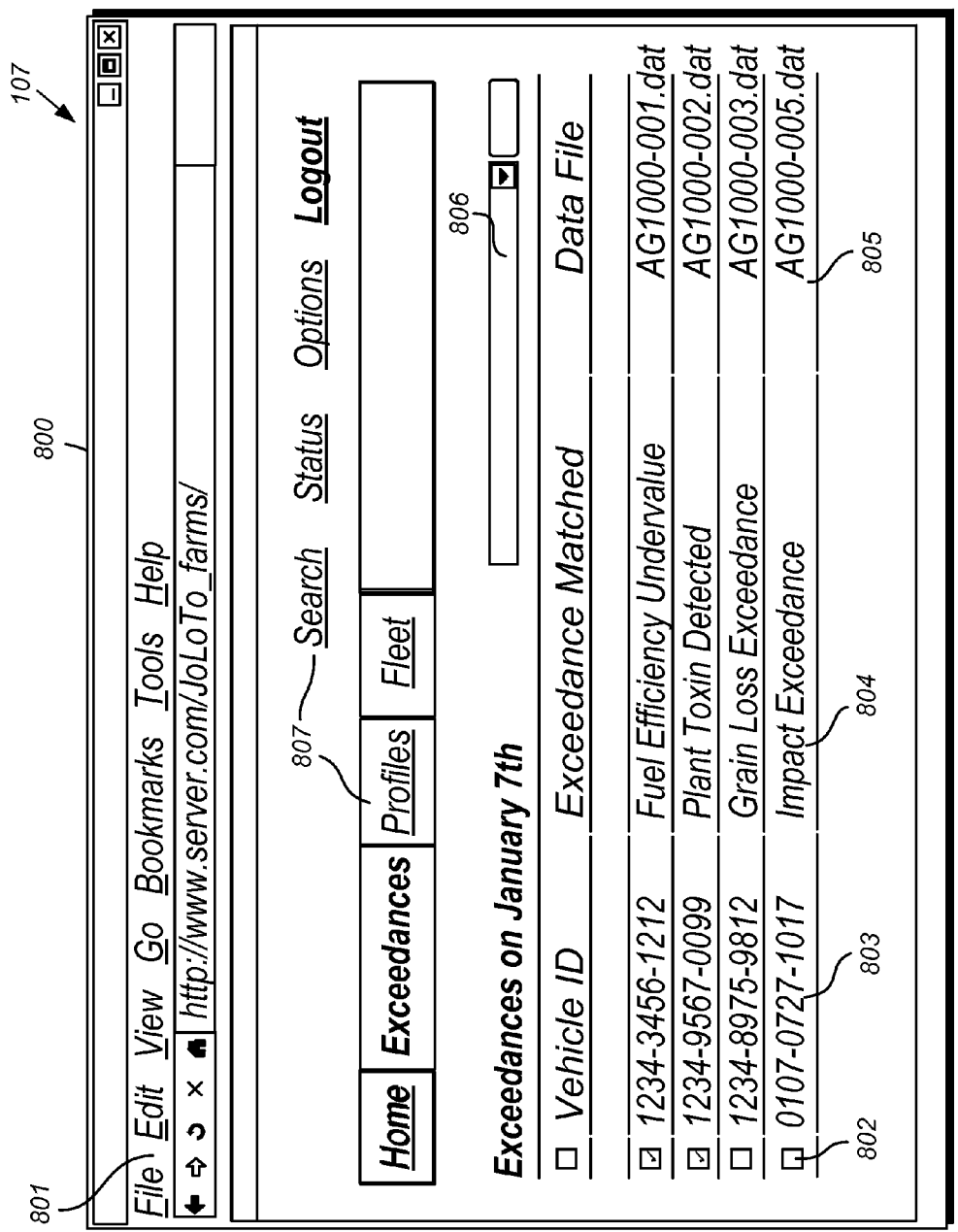
FIG. 12 is an alternate embodiment of the representative display on the user interface shown in FIG. 8.

FIG. 12 is an alternate embodiment of the representative display on the user interface shown in FIG. 8, but modified for a ground vehicle fleet application, illustrating how the web application 107 of FIG. 8 might appear for this alternate embodiment of the invention.

Typical screen controls 801 can be used to navigate through and interact with the web application. Check boxes 802 are provided on the screen to allow the user/operator to select one or more deviations or exceedances on which to perform operations such as deletion or archival. An identification number 803 is provided for each deviation showing which gateway module 1050 was used to record the particular deviation. The type or title of the deviation 804 is displayed next to the identification number 803, and the name of the data file 805 from which the information was generated is also displayed. The operator may select specific actions to be applied to the selected deviation using the command picklist 806. Other pages of the web application can be accessed using hyperlinks 807.

Figure 13:
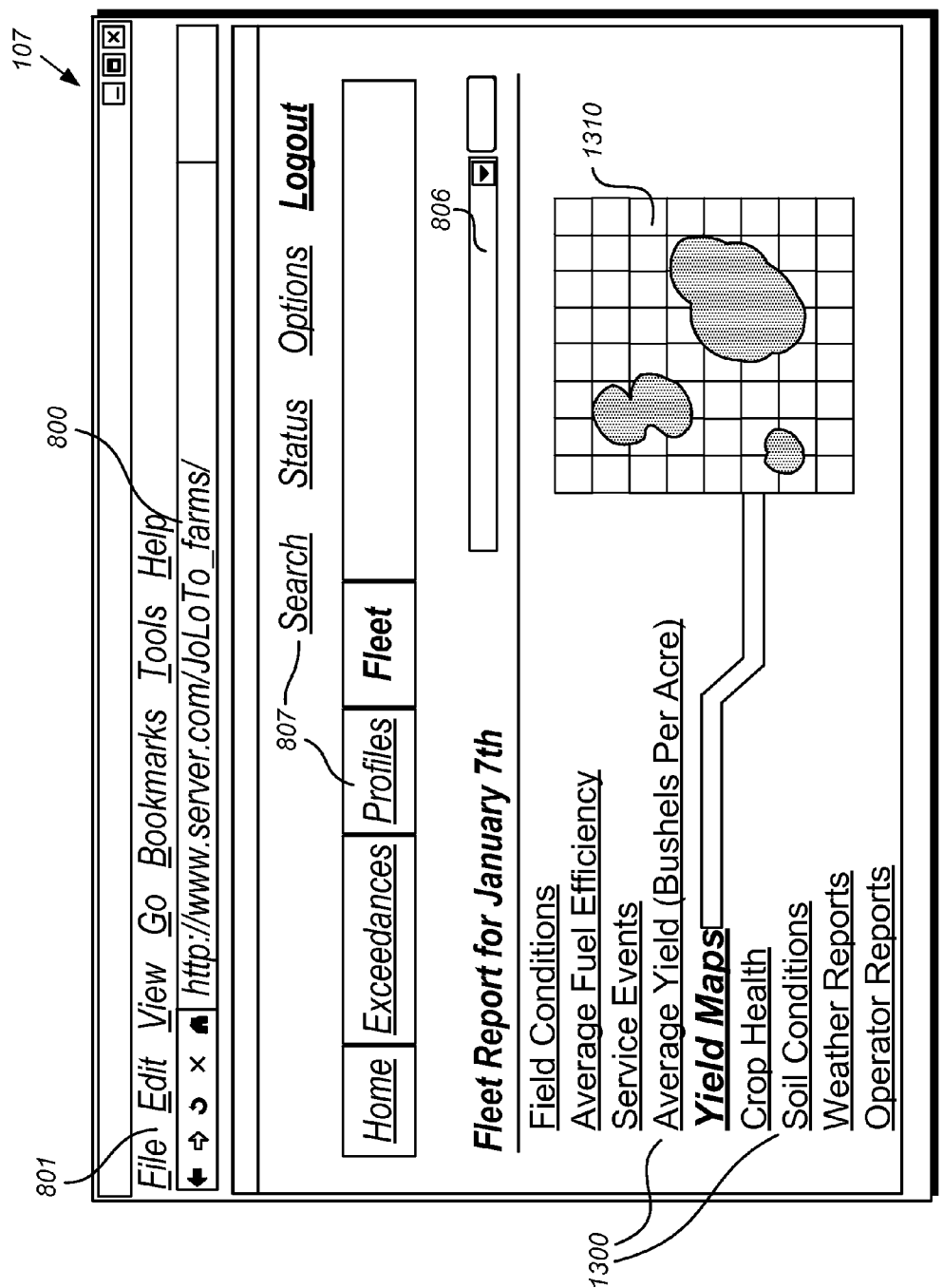
FIG. 13 is an example screen for a user interface for the alternate embodiment of the fleet operations quality management system of FIG. 10A showing how information on the entire fleet may be displayed in a single screen

FIG. 13 is an example screen for a user interface for the alternate embodiment of the fleet operations quality management system of FIG. 10A showing how information on the entire fleet may be displayed in a single screen 107. The screen controls 801, address line 800, hyperlinks 807, picklists 806 shown on FIGS. 8 and 12 may be present, or may be replaced with alternate user interface controls. Fleet information links 1300 are listed on the screen, offering the operator access to various reports and information displays on topics related to the fleet as a whole or to a defined subset of the whole fleet. A preview 1310 of the items may be displayed on the screen 107 when a link is selected or hovered over.

The types of information links 1300 available may include fleet averages (such as average fuel economy or average seeding rates over a fleet), weather conditions sensed or detected over an entire fleet, vehicle statuses seen over the fleet, a summary of reports given by individual operators of vehicles at different points and locations in the fleet, and any other type of data that either represents the entire fleet as a whole or which can be summarized for the fleet. The examples shown in FIG. 13 are examples only and not meant to be limiting in any way.

It should be noted that the web applications and user interfaces shown in FIGS. 8, 11, 12, and 13 are intended to be examples only and are not meant to be limiting in any way. Any appropriate type of user interfaces can be used to display information on the vehicles or fleet as a whole.

Having described the preferred embodiment, it will become apparent that various modifications can be made without departing from the scope of the invention as defined in this document.

Having thus described the invention, what is claimed as new and desired to be secured by Letters Patent is:

1. A vehicle behavior monitoring system, comprising:
   a plurality of ground vehicles, each vehicle comprising an electronic gateway module and a vehicle display, wherein the gateway module is in communication with a subsystem of the vehicle and wherein the gateway module is in communication with the vehicle display;
   a centralized server, wherein the centralized server is connected to the Internet;
   a communications link, wherein the communications link allows the gateway module to exchange information with the centralized server;
   a plurality of external applications, wherein the external applications are connected to and can exchange information with the centralized server;
   whereby a condition of at least one vehicle of the plurality of ground vehicles can be communicated to the centralized server;
   whereby the centralized server can collect and process the conditions collectively for the plurality of ground vehicles and make the collected and processed conditions available to the vehicle display through the gateway module;
   whereby the centralized server can make the collected and processed conditions available to the plurality of external applications; whereby the collected conditions can be analyzed by the fleet operations quality assurance application to identify when at least one of the plurality of ground vehicles has performed outside of a predefined range of expected behavior;
   and the centralized server generates a report of said collected conditions; wherein said collected conditions comprising: grain quality conditions.

2. The vehicle behavior monitoring system of claim 1, wherein the centralized server is an Internet-based cloud server.

3. The vehicle behavior monitoring system of claim 1, wherein at least one of the plurality of external applications is a web application offering summary information on the plurality of ground vehicles.

4. The vehicle behavior monitoring system of claim 1, wherein the communications link is a wireless communications link.

5. The vehicle behavior monitoring system of claim 1, wherein the plurality of ground vehicles is a plurality of agricultural vehicles.

6. The vehicle behavior monitoring system of claim 1, wherein the condition of at least one vehicle of the plurality of ground vehicles is an environmental condition affecting the vehicle.

7. The vehicle behavior monitoring system of claim 1, wherein the condition of at least one vehicle of the plurality of ground vehicles is a condition of at least one subsystem of the at least one vehicle.

8. The vehicle behavior monitoring system of claim 1, wherein the condition of at least one vehicle of the plurality of ground vehicles is a condition of an implement attached to the at least one vehicle.

9. A vehicle behavior monitoring system for a ground vehicle, which system comprises:
   an electronic gateway module mounted on the vehicle and in communication with a subsystem of the vehicle;
   a vehicle display mounted on the vehicle and connected to the gateway module;
   a centralized server configured for connection to the Internet;
   a communications link between the gateway module and the centralized server and configured for exchanging information therebetween;
   said system configured for communicating vehicle subsystem information to the centralized server via the gateway module; and
   said centralized server configured for processing and transforming the vehicle subsystem information; and the centralized server generates a report of said collected conditions; wherein said collected conditions comprising: grain quality conditions.

10. The vehicle behavior monitoring system of claim 9, which includes:
    multiple said electronic gateway modules each configured for mounting on a respective vehicle in a fleet;
    multiple vehicle displays each configured for mounting on a respective vehicle and connected to a respective gateway module; and
    said centralized server configured for controlling and synchronizing the operation of said multiple vehicles.

11. A vehicle behavior monitoring method, comprising the steps of:
    equipping each vehicle of a plurality of ground vehicles with an electronic gateway module and a vehicle display, wherein the gateway module is in communication with a subsystem of the vehicle and wherein the gateway module is in communication with the vehicle display;
    collecting information on a condition of at least one vehicle of the plurality of vehicles in the gateway module of the at least one vehicle;

sending the information on the condition to a cloud-based centralized server on a wireless communication link;

collecting and processing the data using the centralized server; and providing access to the collected and processed data to a plurality of external applications, wherein the external applications are connected to and can exchange information with the centralized server; and generating with said centralized server a report of said collected conditions; wherein said collected conditions comprising: grain quality conditions.

12. The vehicle behavior monitoring method of claim 11, wherein the centralized server is an Internet-based cloud server.

13. The vehicle behavior monitoring method of claim 11, wherein at least one of the plurality of external applications is a web application offering summary information on the plurality of ground vehicles.

14. The vehicle behavior monitoring method of claim 11, wherein the plurality of ground vehicles is a plurality of agricultural vehicles.

15. The vehicle behavior monitoring method of claim 11, wherein the condition of at least one vehicle of the plurality of ground vehicles is an environmental condition affecting the vehicle.

16. The vehicle behavior monitoring method of claim 11, wherein the condition of at least one vehicle of the plurality of ground vehicles is a condition of at least one subsystem of the at least one vehicle.

17. The vehicle behavior monitoring method of claim 11, wherein the condition of at least one vehicle of the plurality of ground vehicles is a condition of an implement attached to the at least one vehicle.

18. A vehicle behavior monitoring method, comprising the steps of:

equipping each vehicle of a plurality of ground vehicles with an electronic gateway module and a vehicle display, wherein the gateway module is in communication with a subsystem of the vehicle and wherein the gateway module is in communication with the vehicle display;

collecting information on a condition of at least one vehicle of the plurality of vehicles in the gateway module of the at least one vehicle;

providing an Internet-based centralized server;

providing a wireless communications link via the cloud, wherein the communications link allows the gateway module to exchange information with the centralized server;

providing a communications link, wherein the communications link allows the gateway module to exchange information with the centralized server, wherein the centralized server is connected to the Internet;

sending the information on the vehicle condition to the centralized server;

collecting and processing the data using the centralized server;

providing access to the collected and processed data to an external application configured for exchanging information including an environmental condition affecting the vehicle with the centralized server;

said external application comprises a web application; and providing summary information on the plurality of ground vehicles via the web application; and generating with said centralized server a report of said collected conditions; wherein said collected conditions comprising: grain quality conditions.

19. The vehicle behavior monitoring method of claim 18, wherein the ground vehicles are agricultural vehicles each including an implement and the vehicle condition is a condition of the implement.

\* \* \* \* \*